(12) United States Patent
Oka et al.

(10) Patent No.: US 9,927,010 B2
(45) Date of Patent: Mar. 27, 2018

(54) BALL SCREW DEVICE

(71) Applicant: NSK LTD., Tokyo (JP)

(72) Inventors: Keitaro Oka, Kanagawa (JP);
Kazunari Miyazaki, Kanagawa (JP)

(73) Assignee: NSK Ltd., Tokyo (JP)

( * ) Notice: Subject to any disclaimer, the term of this patent is extended or adjusted under 35 U.S.C. 154(b) by 12 days.

(21) Appl. No.: 15/237,796

(22) Filed: Aug. 16, 2016

(65) Prior Publication Data

US 2017/0030446 A1 Feb. 2, 2017

Related U.S. Application Data

(62) Division of application No. 14/399,574, filed as application No. PCT/JP2013/002996 on May 9, 2013, now abandoned.

(30) Foreign Application Priority Data

| May 10, 2012 | (JP) | 2012-108700 |
| May 25, 2012 | (JP) | 2012-119723 |
| Mar. 22, 2013 | (JP) | 2013-060362 |

(51) Int. Cl.
*F16H 25/24* (2006.01)
*F16H 25/22* (2006.01)

(52) U.S. Cl.
CPC ..... *F16H 25/2204* (2013.01); *F16H 25/2418* (2013.01); *F16H 2025/2242* (2013.01); *Y10T 74/19744* (2015.01)

(58) Field of Classification Search
CPC ......... F16H 25/2418; F16H 2025/2242; F16H 25/2204
See application file for complete search history.

(56) References Cited

U.S. PATENT DOCUMENTS 5,517,901 A * 5/1996 Lipinski ............... F15B 15/082
277/345
5,555,771 A * 9/1996 Kuroiwa ............... F16B 19/004
277/354

(Continued)

FOREIGN PATENT DOCUMENTS

| CN | 101025223 A | 8/2007 |
| CN | 201125995 Y | 10/2008 |

(Continued)

OTHER PUBLICATIONS

International Search Report (PCT/ISA/210) dated Jun. 25, 2013, with English translation (three (3) pages).

(Continued)

*Primary Examiner* — William Kelleher
*Assistant Examiner* — Gregory T Prather
(74) *Attorney, Agent, or Firm* — Crowell & Moring LLP

(57) ABSTRACT

There is provided a ball screw device capable of allowing interference to be easily elastically deformable and decreasing friction resistance of a seal member with respect to a screw shaft without damaging seal properties of the seal member. A predetermined section of a land sliding-contact portion (46) of a sliding-contact portion (40) and a section of a seal piece (37) of a lip portion (31) corresponding to the predetermined section are bent to protrude in one side in the axial direction of a nut (7) so that a protrusion (55) is formed, the bent section of the land sliding-contact portion (46) and the bent section of the seal piece (37) configure a pair of side surface portions (58, 58) of the protrusion (55) and a bottom portion (61) connecting the one side ends of the pair of side surface portions (58, 58).

6 Claims, 25 Drawing Sheets

(56) References Cited

U.S. PATENT DOCUMENTS

| | | | |
|---|---|---|---|
| 2002/0113376 A1 | 8/2002 | Yabe et al. | |
| 2008/0092678 A1* | 4/2008 | Liao | F16C 29/084 |
| | | | 74/89.4 |
| 2008/0196523 A1* | 8/2008 | Liu | F16H 25/2418 |
| | | | 74/89.4 |
| 2016/0298757 A1* | 10/2016 | Miyazaki | F16H 25/2418 |

FOREIGN PATENT DOCUMENTS

| | | |
|---|---|---|
| DE | 693 131 C | 7/1940 |
| JP | 5-44810 A | 2/1993 |
| JP | 9-303517 A | 11/1997 |
| JP | 2001-193815 A | 7/2001 |
| JP | 2003-148628 A | 5/2003 |
| JP | 2003-287102 A | 10/2003 |
| JP | 2004-156704 A | 6/2004 |
| JP | 2008-133944 A | 6/2008 |
| JP | 2010-127355 A | 6/2010 |

OTHER PUBLICATIONS

Japanese-language Written Opinion (PCT/ISA/237) dated Jun. 25, 2013 (five (5) pages).

International Preliminary Report on Patentability (PCT/IB/338, PCT/IB/237 and PCT/IB/373) dated Nov. 11, 2014 (eight (8) pages).

Taiwanese Office Action dated Jan. 14, 2015, with partial English translation (five (5) pages).

Japanese Office Action dated Jun. 23, 2015 with partial English translation (Seven (7) pages).

Chinese Office Action dated Jul. 1, 2015 with English translation (Twelve (12) pages).

Japanese Office Action issued in counterpart Japanese Application No. 2014-514388 dated Oct. 20, 2015, with partial English translation (four (4) pages).

Korean-language Office Action issued in counterpart Korean Application No. 10-2014-7033003 dated Jan. 7, 2016 with partial English translation (Eight (8) pages).

* cited by examiner

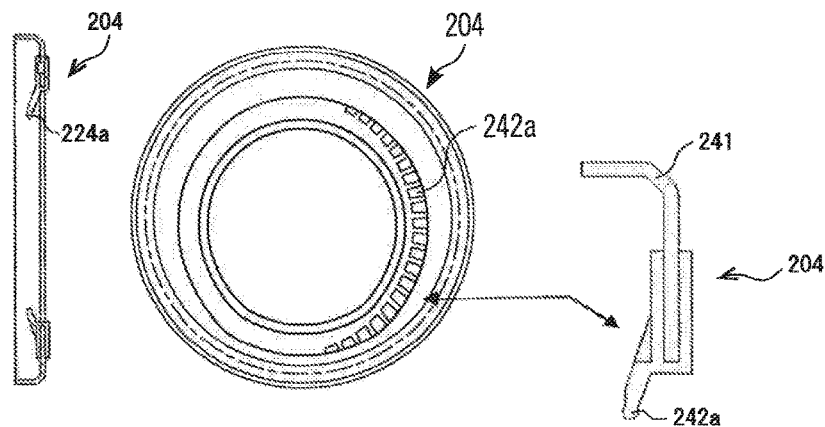
FIG. 20A   FIG. 20B   FIG. 20C
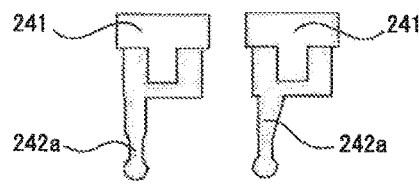
FIG. 21A   FIG. 21B
FIG. 22
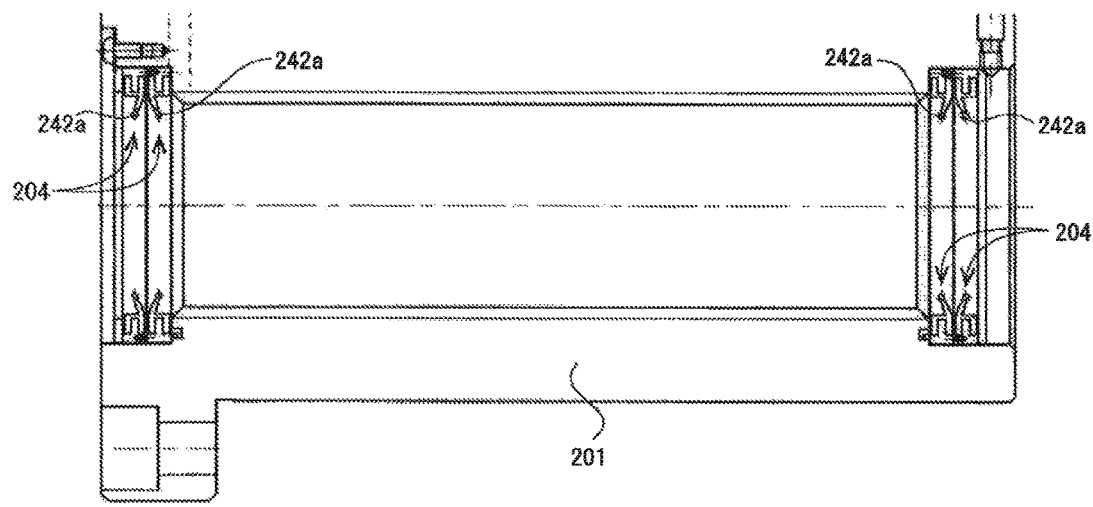

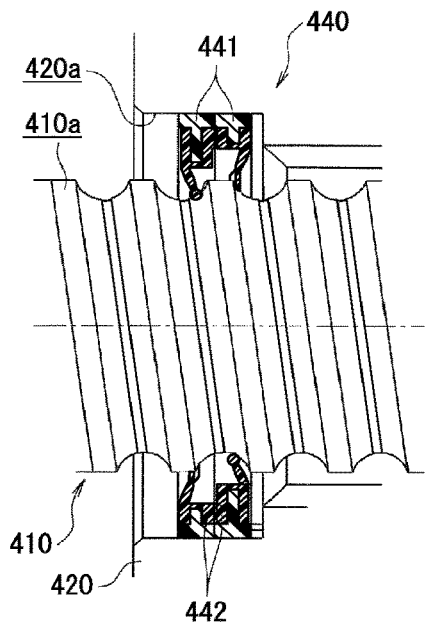
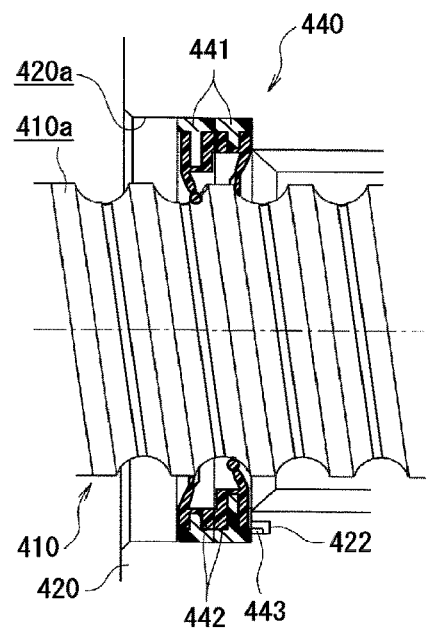
FIG. 34A    FIG. 34B
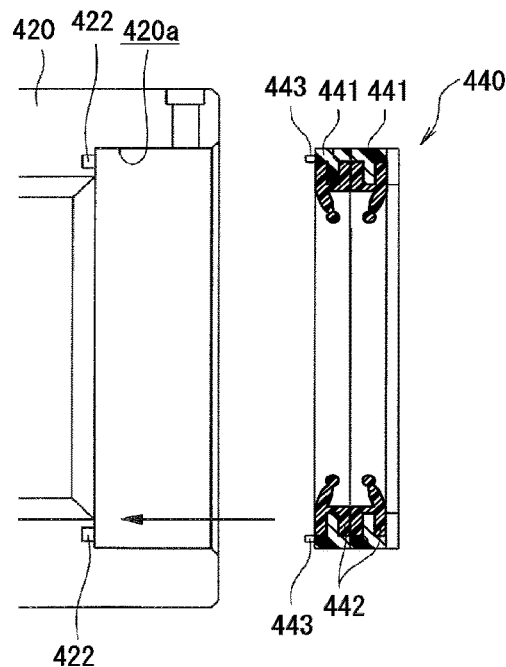
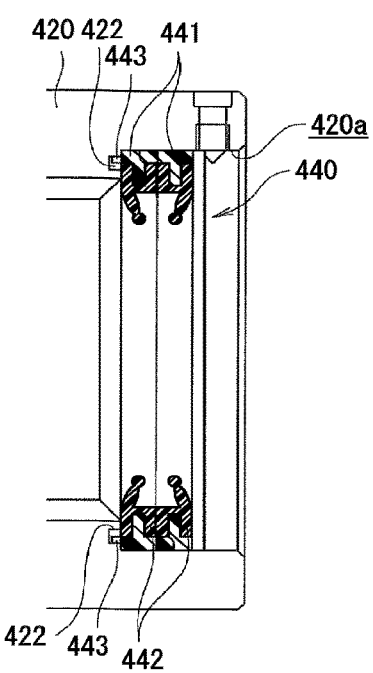
FIG. 35A    FIG. 35B

BALL SCREW DEVICE

CROSS REFERENCE TO RELATED APPLICATIONS

This application is a divisional of U.S. application Ser. No. 14/399,574, filed Nov. 7, 2014, which is a 371 of International Application No. PCT/JP2013/002996, filed May 9, 2013, which claims priority from Japanese Patent Application Nos. 2013-060362, filed Mar. 22, 2013, 2012-108700, filed May 10, 2012 and 2012-119723, filed May 25, 2012, the disclosures of which are expressly incorporated by reference herein.

TECHNICAL FIELD

The present invention relates to a ball screw device which is used as, for example, a mechanical element of a steering device, a heavy cargo moving device, a machine for processing, a precision positioning device, or the like.

BACKGROUND ART

As a mechanism which converts rotary motion to linear motion, a ball screw device is known. The ball screw device includes a linear screw shaft on which helical rolling grooves are formed on the outer circumferential surface, and a nut on which helical rolling grooves opposing the rolling grooves of the screw shaft are formed on the inner circumferential surface, the nut is screwed with the outer circumferential side of the screw shaft via a plurality of balls interposed between both rolling grooves, and is able to move in an axial direction of the screw shaft by rotating the screw shaft. Seal members are provided on both ends in the axial direction of the nut, each of the seal members is externally fitted to the nut, prevents intrusion of dust or the like from the outside to a portion between the nut and the screw shaft, and prevents leakage of lubricant existing between the nut and the screw shaft to the outside.

Since the rolling groove is formed on the outer circumferential surface of the screw shaft, across-sectional shape of the screw shaft in a direction perpendicular to the axial direction is not a simple circle. Accordingly, a gap is easily generated between the screw shaft and the seal member due to errors of shape accuracy or mounting errors of the seal member, and in order to prevent this, heavy labor is required for control and adjustment of the shape and mounting accuracy of the seal member. If interference of the seal member with respect to the screw shaft is increased, the errors of shape accuracy or mounting errors are reduced, and the occurrence of the gap is able to be suppressed. However, simultaneously, a contact pressure of the seal member with respect to the screw shaft is increased. That is, friction resistance of the seal member with respect to the screw shaft is increased. Accordingly, there is a concern that operating performance of the ball screw device may be deteriorated. Moreover, since heat due to the friction is increased, positioning accuracy of the ball screw device is decreased.

Thus, a ball screw device is suggested in which a lip portion of a seal member is composed of a lubricant-containing polymer, and a thickness dimension of the lip portion is smaller than a width dimension of a rolling groove of a screw shaft (for example, refer to PTL 1). According to the configuration disclosed in PTL 1, even when predetermined interference with respect to the screw shaft is formed on the seal member, due to a decrease in a contact area between the lip portion and the screw shaft and a friction reduction effect by the lubricant exuding from the lubricant-containing polymer, the friction resistance of the seal member with respect to the screw shaft is able to be suppressed.

CITATION LIST

Patent Literature

PTL1: JP 9-303517 A

SUMMARY OF INVENTION

Technical Problem

However, in the seal member of the ball screw device of PTL 1, the lip portion is formed of the lubricant-containing polymer, three lip portions are configured to be combined to be arranged along an axial direction of the nut, and thus, the configuration is complicated.

As a method which secures the interference having sufficient magnitude to prevent the occurrence of the gap between the screw shaft and the seal member without the complicated configuration and suppresses a contact pressure with respect to the screw shaft, a method which decreases stiffness of the lip portion of the seal member and allows the interference to be easily elastically deformable is considered. However, if the stiffness of the lip portion is decreased, the seal properties are also decreased, and thus, there is a concern that the original function of the seal member may be damaged.

The present invention is made to solve the above-described problems, and an object thereof is to provide a ball screw device capable of allowing interference to be easily elastically deformable and suppressing a friction resistance of a seal member with respect to a screw shaft without damaging the seal properties of the seal member.

Solution to Problem

According to an aspect of the present invention, there is provided a ball screw device including: a screw shaft which linearly extends and includes a helical rolling groove formed on an outer circumferential surface; a cylindrical nut which includes a rolling groove opposing the helical rolling groove on an inner circumferential surface, and is screwed to the screw shaft via a plurality of balls which is disposed between the rolling groove and the helical rolling groove of the screw shaft; balls which are disposed between track grooves formed of the rolling groove of the nut and the rolling groove of the screw shaft; an annular sealing device which is provided on an inner diameter side of the nut and seals a gap between the nut and screw shaft; and a tip portion of a lip portion which is externally fitted to the screw shaft and includes an inner circumferential edge portion coming into sliding-contact with an outer circumferential surface of the screw shaft, in which the tip portion of the lip portion includes an easily deformable portion which is elastically deformed so that a shape of the inner circumferential edge portion is matched to a shape of the outer circumferential surface of the screw shaft when the tip portion of the lip portion is assembled to the screw shaft.

In the ball screw device, the easily deformable portion may be a protrusion formed in an approximately U shape in which a section of the inner circumferential edge is bent to protrude to one side in the axial direction of the nut and is opened to the other side in the axial direction, and is more easily deformed elastically than the sections of the sealing device (seal member) other than the easily deformable portion.

Moreover, in the ball screw device, the protrusion may be elastically deformed so that the opening is enlarged.

In addition, in the ball screw device, the inner circumferential edge may include a groove sliding-contact portion which comes into sliding-contact with a groove surface of the rolling groove of the screw shaft, and an outer circumferential sliding-contact portion which comes into sliding-contact with the outer circumferential surface section between the rolling grooves adjacent in the axial direction, and the easily deformable portion may be formed on the outer circumferential sliding-contact portion.

Moreover, the inner circumferential edge may include a groove sliding-contact portion which comes into sliding-contact with a groove surface of the rolling groove of the screw shaft, and an outer circumferential sliding-contact portion which comes into sliding-contact with the outer circumferential surface section between the rolling grooves adjacent in the axial direction, a cross-sectional area of the outer circumferential sliding-contact portion may be formed to be smaller than a cross-sectional area of the groove sliding-contact portion, and the easily deformable portion may be the outer circumferential sliding-contact portion.

In addition, in the ball screw device, the outer circumferential sliding-contact portion may be elastically deformed to extend in the circumferential direction of the inner circumferential edge.

Moreover, in the ball screw device, the inner circumferential edge may include a large diameter portion having a large cross-sectional diameter, and a small diameter portion having a smaller cross-sectional diameter than that of the large diameter portion, and the easily deformable portion may be the small diameter portion.

In addition, in the ball screw device, the small diameter portion may be elastically deformed to extend in the circumferential direction of the inner circumferential edge.

Moreover, in the ball screw device, the helical rolling groove of the screw shaft may include a grinding clearance groove, and a depth of the grinding clearance groove may be set to be smaller than interference of the tip portion of the lip portion with respect to the screw shaft.

Specifically, a ball screw device includes a nut in which a rolling groove is formed on an inner circumferential surface, a screw shaft in which a rolling groove is formed on an outer circumferential surface, balls which are disposed between track grooves formed of the rolling groove of the nut and the rolling groove of the screw shaft, and a sealing device (for example, seal member) which is disposed on both ends in the axial direction of the nut and includes a lip portion coming into contact with the outer circumferential surface and the rolling groove of the screw shaft in an elastic deformation state, the rolling groove of the screw shaft includes a grinding clearance groove, and a depth of the grinding clearance groove is set to be smaller than interference of the seal member with respect to the screw shaft.

According to the ball screw device, since the depth of the grinding clearance groove is set to be smaller than the interference of the seal member with respect to the screw shaft, the seal member also comes into contact with the grinding clearance groove. Accordingly, it is possible to secure improved dust resistance and lubricant sealing performance by the contact seal. As a result, compared to when the grinding clearance groove is not provided, it is possible to decrease a cost for preventing seizure between a grindstone and the surface of the rolling groove when grinding is performed and deformation of the screw shaft due to heating.

In addition, according to the ball screw device, by using a seal member having interference S corresponding to the screw shaft in which the grinding clearance groove is not provided on the rolling groove, the grinding clearance groove having a depth D (<S) corresponding to the interference S is formed on the rolling groove of the screw shaft, and thus, the grinding clearance groove is able to be easily formed.

In addition, in the ball screw device, an angle at which the grinding clearance groove and the rolling groove come into contact with each other may be equal to or more than 155°.

Moreover, in the ball screw device, the interference of a section in which the sealing device comes into contact with the vicinity of the grinding clearance groove may be larger than the interference of a section in which the sealing device comes into contact with sections other than the grinding clearance groove.

In addition, in the ball screw device, the shape of the grinding clearance groove may be a gothic arc shape.

Moreover, the rolling groove of the screw shaft and the grinding clearance groove have a smooth cross-sectional shape formed with a curved surface portion.

In addition, in the ball screw device, the sealing device (for example, seal member) may include a fitting portion on which at least one or more convex portions protruding in an axial direction are provided, and when an axial direction of the nut and an axial direction of the sealing device are approximately the same direction as each other, at least one or more concave portions may be provided on an end of an inner circumferential surface of the nut according to a disposition of the convex portion in the fitting portion, a direction in which the convex portion protrudes may oppose a direction in which the concave portion is opened, the convex portion and the concave portion may be fitted to each other, the lip portion may protrude inwardly toward the helical rolling groove of the screw shaft, and the sealing device may be fitted to the inner circumferential surface of the nut.

Specifically, there is provided a ball screw device including: a screw shaft which includes a helical rolling groove on an outer circumferential surface; a nut which includes a helical rolling groove on an inner circumferential surface; a plurality of balls which is disposed in a circulation track formed of the rolling grooves; and a sealing device (for example, seal member) which is provided on an end of the nut, in which the sealing device includes a fitting portion on which one or more convex portions protruding in at least one of the axial direction and the radial direction are provided, and when an axial direction of the nut and an axial direction of the sealing device are approximately the same direction as each other, one or more concave portions are provided on an end of an inner circumferential surface of the nut according to disposition of the convex portion in the main body portion, a direction in which the convex portion protrudes opposes a direction in which the concave portion is opened, the convex portion and the concave portion are fitted to each other, the lip portion protrudes inwardly toward the rolling groove of the screw shaft, and the sealing device is fitted to the inner circumferential surface of the nut.

According to the ball screw device, it is possible to provide a ball screw device capable of simply and securely positioning a sealing device on an end of a nut without deforming the sealing device.

Here, in the ball screw device, a tip portion of the convex portion may be chamfered or curved-surface processed, or a bottom surface of the concave portion may be also chamfered or curved-surface processed.

Moreover, in the ball screw device, the convex portion may have elasticity in the axial direction.

Moreover, in the ball screw device, a gap $C_3$ between the convex portion and the concave portion in the radial direction may be larger than a gap $C_1$ between the outer circumferential surface of the sealing device and the inner circumferential surface of the nut, or a gap $C_2$ between the lip portion of the sealing device and the outer circumferential surface of the screw shaft.

Advantageous Effects of Invention

According to the present invention, it is possible to provide a ball screw device capable of allowing interference to be easily elastically deformable and suppressing friction resistance of a seal member with respect to a screw shaft without damaging the seal properties of the sealing device (for example, seal member).

BRIEF DESCRIPTION OF DRAWINGS

FIG. 2A is an outline view when viewed from an axial direction of a screw shaft, FIG. 2B is a cross-sectional view taken along line X-X of FIG. 2A, and FIG. 2C is an enlarged cross-sectional view of a lip portion;

FIG. 4A is an outline view when viewed from an axial direction of a screw shaft, and FIG. 4B is a cross-sectional view taken along line X-X of FIG. 4A;

FIG. 5A is an outline view when viewed from an axial direction of a screw shaft, FIG. 5B is a cross-sectional view taken along line Y-Y of FIG. 5A, and FIG. 5C is a cross-sectional view taken along line Z-Z of FIG. 5A;

FIG. 6A is an outline view when viewed from an axial direction of a screw shaft, FIG. 6B is a cross-sectional view taken along line Y-Y of FIG. 6A, and FIG. 6C is a cross-sectional view taken along line Z-Z of FIG. 6A;

FIG. 18A is a side view, FIG. 18B is a front view, and FIG. 18C is a main portion enlarged view;

FIG. 19A is a side view, FIG. 19B is a front view, FIG. 19C is a main portion enlarged view, and FIG. 19D is a schematic view illustrating an operation;

FIGS. 20A to 20C are views illustrating an example of the shape of the seal member in the third embodiment of the ball screw device of the present invention, FIG. 20A is a side view, FIG. 20B is a front view, and FIG. 20C is a main portion enlarged view;

FIGS. 21A and 21B are views illustrating an example of the seal member in the third embodiment of the ball screw device of the present invention;

FIG. 22 is a cross-sectional view when two seal members illustrated in FIG. 19 are overlapped with each other and assembled to the nut;

FIG. 29A is a cross-sectional view along an axial direction, and FIG. 29B is a front view;

FIG. 32A is a partial cross-sectional view along the axial direction illustrating a state where the convex portion is hooked to an end of an inner circumferential surface of the nut, and FIG. 32B is a partial cross-sectional view along the axial direction illustrating a state where the convex portion is fitted to a concave portion;

FIG. 33A is a partial cross-sectional view along the axial direction before the seal member is mounted, and FIG. 33B is a partial cross-sectional view along the axial direction after the seal member is mounted;

FIGS. 34A to 34B are views illustrating a state where a screw shaft having a grinding clearance groove is adopted and when the seal member is mounted in the fourth embodiment of the ball screw device according to the present invention, FIG. 34A is a partial cross-sectional view along the axial direction illustrating a state where the convex portion is hooked to the end of the inner circumferential surface of the nut, and FIG. 34B is a partial cross-sectional view along the axial direction illustrating a state where the convex portion is fitted to the concave portion;

FIGS. 35A and 35B are views illustrating a mounting method of the seal member in which the lip portion is positioned in a direction different from that of the lip portion of the seal member illustrated in FIG. 33 in the fourth embodiment of the ball screw device according to the present invention, FIG. 35A is a partial cross-sectional view along the axial direction before the seal member is mounted, and FIG. 35B is a partial cross-sectional view along the axial direction after the seal member is mounted;

DESCRIPTION OF EMBODIMENTS

First Embodiment

Hereinafter, a first embodiment of the present invention will be described with reference to the drawings. First, a configuration of a ball screw device according to the present invention will be described. In addition, in the present specification, a longitudinal direction in which a screw shaft extends is set to an axial direction, and a direction orthogonal to the axial direction is set to a radial direction. Moreover, the directions are similarly applied to a state where a nut and a sealing device (hereinafter, may be referred to as a seal member) are assembled to the screw shaft.

Figure 1:
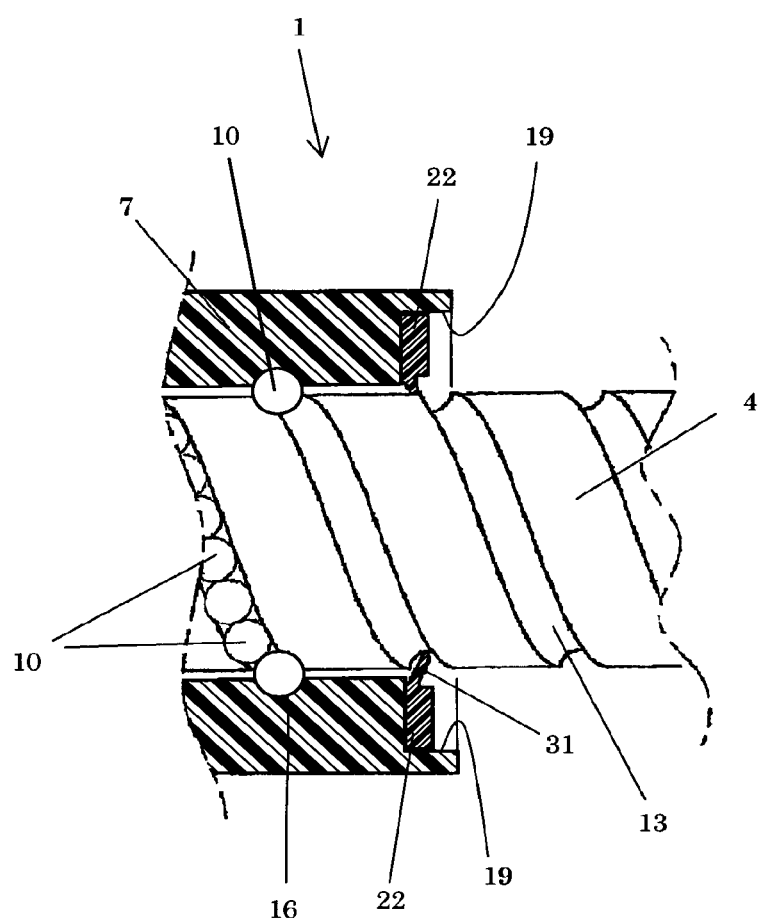
FIG. 1 is a partial cross-sectional view of a main portion in a first embodiment of a ball screw device of the present invention.

FIG. 1 is a cross-sectional view of a main portion of the ball screw device according to the first embodiment of the present invention.

A ball screw device 1 includes a screw shaft 4 which linearly extends and has an approximately circular cross-section shape, and a nut 7 which is screwed with the outer circumferential surface of the screw shaft 4 and has an approximately cylindrical shape. Helical rolling grooves 13 for rolling balls 10 which are a rolling elements are formed on the outer circumferential surface of the screw shaft 4. In the present embodiment, two lines of rolling grooves 13 are formed. The cross-sectional shape of the rolling groove 13 is a half-arc shape. Helical rolling grooves 16 and 16 having a half-arc shaped cross-section are formed on the inner circumferential surface of the nut 7 to be opposite to two lines of rolling grooves 13 and 13 of the screw shaft 4. A rolling path of the ball 10 is formed of the rolling groove 13 of the screw shaft 4 side and the rolling groove 16 of the nut 7 side which are opposite to each other. Accordingly, the ball screw device 1 includes two rolling paths of the ball 10.

A plurality of balls 10 is installed to freely roll in each rolling path, and the nut 7 is screwed with the screw shaft 4 via the ball 10. According to this configuration, the ball screw device 1 is able to move the nut 7 in the axial direction of the screw shaft 4 by rotating the screw shaft 4.

The screw shaft 4 and the nut 7 are relatively rotated, and thus, the ball 10 rolls on the rolling path. A circulation path (not illustrated), through which the ball 10 rolled to an endpoint of the rolling path is returned to a predetermined point of the rolling path, is provided on the nut 7. Accordingly, the ball 10 is able to circulate through the rolling path via the circulation path (not illustrated). The circulation path (not illustrated) may be provided to penetrate a thickness portion of the nut 7, and may be formed in a top-locking type. Alternatively, the circulation path may be formed in an end deflector type, a tube type, or an end cap type. In addition, since the type with respect to the circulation path (not illustrated) is a well-known technology, here, detailed descriptions thereof are omitted.

Circular concave portions 19 (only one side concave portion 19 is illustrated in FIG. 1) for mounting the seal members are respectively formed on both ends in the axial direction of the nut 7. For example, an annular seal member 22, which is externally fitted to the screw shaft 4 and is a sealing device for sealing a gap between the nut 7 and the screw shaft 4, is provided on an inner diameter side of each concave portion 19. For example, the seal member 22 may include an oil seal.

Figure 2A:
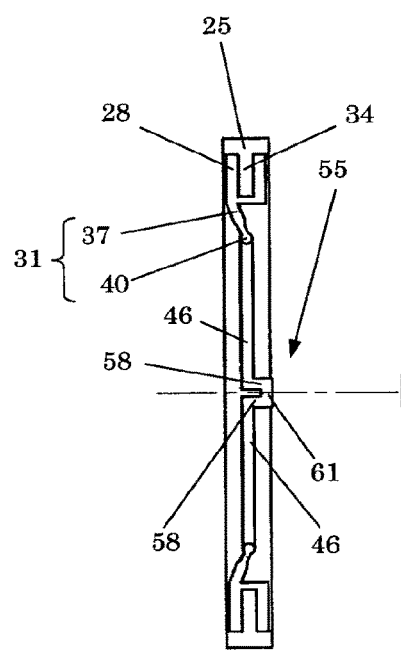
FIGS. 2A to 2C are standalone views of a seal member.
Figure 2B:
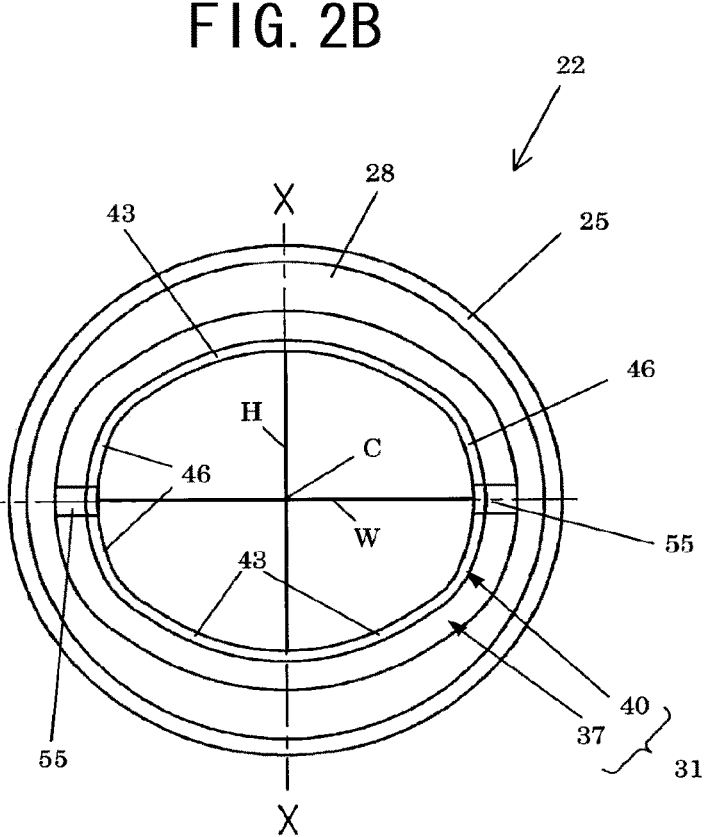
Figure 2C:
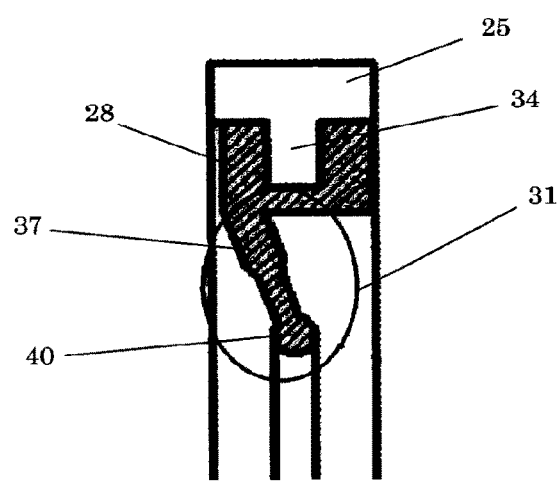

FIGS. 2A to 2C are standalone views of the seal member 22, FIG. 2A is an outline view of the screw shaft 4 when viewed from the axial direction, FIG. 2B is a cross-sectional view taken along line X-X of FIG. 2A, and FIG. 2C is an enlarged cross-sectional view of a lip portion. Moreover, the seal member 22 is used for the ball screw device having two lines of rolling grooves 13.

As illustrated in of FIGS. 2A to 2C, the seal member 22 includes an outer diameter side annular core metal 25, an annular main body portion 28 fixed to the inner circumferential side of the core metal 25, and a lip portion 31 which is formed to protrude from the inner diameter portion of the main body portion 28 to the inside in the radial direction. The lip portion 31 is formed over the entire circumference in a circumferential direction. The inner diameter side of the lip portion 31 is an opening portion, and the screw shaft 4 is inserted into the opening portion. The core metal 25 is configured of a metal or a hard synthetic resin, and is formed in a circular shape. A convex portion 34 protruding inwardly in the radial direction is formed on the core metal 25, and the cross-sectional shape of the core metal 25 is formed in an approximately T shape. The core metal 25 is fitted to the inner circumferential surface of the concave portion 19 of the nut 7, and thus, the seal member 22 is fixed to the nut 7.

The main body portion 28 and the lip portion 31 are formed of a flexible elastic material such as elastomer or rubber. The main body portion 28 and the lip portion 31 are formed of an integral material and are configured of an integral member. The cross-sectional shape of the main body portion 28 is formed in an approximately U shape which is opened to the outside in the radial direction. The convex portion 34 of the core metal 25 engages with the U shaped opening of the main body portion 28, and thus, the main body portion 28 is fixed to the core metal 25.

As a material of at least one of the seal portion and the lip portion, various elastomers may be used. Among the elastomers, preferably, a thermoplastic elastomer is used. As the thermoplastic elastomer, a styrene-based thermoplastic elastomer, an olefin-based thermoplastic elastomer, a vinyl chloride-based thermoplastic elastomer, a polyester-based thermoplastic elastomer, a polyurethane-based thermoplastic elastomer, a nylon-based thermoplastic elastomer, or the like may be used. Preferably, the olefin-based thermoplastic elastomer is used.

Moreover, as a material of at least one of the seal portion and the lip portion, various rubbers may used. Specifically, a natural rubber or a synthetic rubber may be used. Among these, preferably, the synthetic rubber is used. As the synthetic rubber, acrylonitrile butadiene rubber, hydrogenated acrylonitrile butadiene rubber, chloroprene rubber, styrene butadiene rubber, isoprene rubber, ethylene propylene rubber, urethane rubber, silicon rubber, fluororubber, acrylic rubber, or the like may be used. Various fillers or additives may be added if necessary. Preferably, fluororubber is used.

In addition, a material of the core metal 25 may include a cold rolled mild steel plate-steel strip (SPCC defined by JIS G 3341), a hot rolled mild steel plate-steel strip (SPHC defined by JIS G 3131), and a hot rolled stainless steel plate-steel strip (SUS304 or SUS316 defined by JIS G 4302 or JIS G 4307).

As illustrated in FIG. 1 and FIGS. 2A and 2B, the lip portion 31 includes a seal piece 37 which extends to be inclined from the inner diameter portion of the main body portion 28 to the outside in the axial direction of the nut 7, and a sliding-contact portion 40 which is formed on the inner diameter side end of the seal piece 37. The sliding-contact portion 40 is a section which comes into sliding-contact with the outer circumferential surface of the screw shaft 4.

The seal piece 37 is formed in a shape similar to a side surface portion of a truncated cone and is formed over the entire circumference in the circumferential direction. The cross-section of the sliding-contact portion 40 is formed in an approximately circular shape, and is formed over the entire circumference of the inner diameter side end of the seal piece 37. Accordingly, the sliding-contact portion 40 forms an annular portion which is continued approximately annularly. The sliding-contact portion 40 of the lip portion 31 comes into sliding-contact with the outer circumferential surface of the screw shaft 4, and thus, the seal member 22 seals the gap between the nut 7 and the screw shaft 4. The cross-section of the sliding-contact portion 40 is an approximately circular shape, and thus, regardless of a contact position between the sliding-contact portion 40 and the screw shaft 4, particularly, a contact position between the sliding-contact portion 40 and the groove surface of the rolling groove 13 in the rolling groove 13 of the screw shaft 4, the contact state between the sliding-contact portion 40 and the screw shaft 4 is able to be constantly maintained.

As illustrated in of FIG. 2C, a diameter dimension of the cross-section of the sliding-contact portion 40 is formed to be larger than a thickness dimension of the inner diameter side end of the seal piece 37. According to the above-described formation, deformation of the sliding-contact portion 40 is suppressed in the state where the sliding-contact portion comes into sliding-contact with the screw shaft 4. Moreover, the diameter dimension of the cross-section of the sliding-contact portion 40 is smaller than the width dimension of the rolling groove 13 of the screw shaft 4. According to the above-described formation, the contact area between the sliding-contact portion 40 and the screw shaft 4 is decreased, and thus, the friction resistance of the seal member with respect to the screw shaft 4 is suppressed.

The seal member 22 is disposed so that the lip portion 31 is inclined toward the direction illustrated in FIG. 1, that is, to the outside in the axial direction of the nut 7, and thus, intrusion of dust or the like from the outside to the gap between the nut 7 and the screw shaft 4 is effectively prevented. In addition, if the seal member 22 is disposed so that the lip portion 31 is inclined from the main body portion 28 toward the inside in the axial direction of the nut 7, when lubricant is interposed between the nut 7 and the screw shaft 4, leakage of the lubricant is able to be effectively prevented.

As illustrated in of FIG. 2A, the shape of the inner circumferential edge of the seal member 22 when viewed from the axial direction, that is, the shape of the sliding-contact portion 40 of the lip portion 31 when viewed from the axial direction is an approximate drum shape or an approximate barrel shape in which a plurality of convex arcs are combined toward the outside in the radial direction. Adjacent arcs smoothly continue. Moreover, in the descriptions below, the shape of the sliding-contact portion 40 of the lip portion 31 when viewed from the axial direction is referred to as a "shape of the inner circumferential edge of the seal member 22".

The shape of the inner circumferential edge of the seal member 22 will be described in more detail. In FIG. 2A, when a center of the circular core metal 25 is set to a point C, a straight line, which connects opposing points on the sliding-contact portion 40 in a short direction (up-down direction on the paper surface of FIG. 2A) of the approximate drum shape or the barrel shape through the point C, is set to H, and a straight line which connects opposing points on the sliding-contact portion 40 in a direction orthogonal to the straight line H through the point C, that is, a longitudinal direction (right-left direction on the paper surface of FIG. 2A) of the approximately drum shape or the approximately barrel shape is set to W, the shape of the inner circumferential edge of the seal member 22 is line symmetric with respect to the straight line H, is line symmetric with respect to the straight line W, and is point symmetric with respect to the point C.

In the present embodiment, the opposing sections of the sliding-contact portion 40 in the up-down direction on the paper surface of FIG. 2A with respect to the straight line W are a range in which the seal member comes into sliding-contact with the rolling groove 13 of the screw shaft 4, specifically, a range in which the seal member comes into sliding-contact with the groove surface of the rolling groove 13. Meanwhile, the opposing sections of the sliding-contact portion 40 in the right-left direction on the paper surface of FIG. 2A with respect to the straight line H are a range in which the seal member comes into sliding-contact with a land of the screw shaft 4. Moreover, the land of the screw shaft 4 means the section of the screw shaft 4 between the rolling grooves 13 and 13 adjacent in the axial direction, that is, the section of the outer circumferential surface of the screw shaft 4 forming the outermost diameter portion of the screw shaft 4.

In this way, the sliding-contact portion 40 of the lip portion 31 includes a pair of sections (hereinafter, this section is referred to as a "groove sliding-contact portion 43") which comes into sliding-contact with the groove surface of the rolling groove 13 of the screw shaft 4 and a pair of sections (hereinafter, this section is referred to as a "land sliding-contact portion 46") which comes into sliding-contact with the land of the screw shaft 4, and each of the groove sliding-contact portions 43 and 43 and each of the land sliding-contact portions 46 and 46 are formed to be alternately continued in the circumferential direction.

Figure 3:
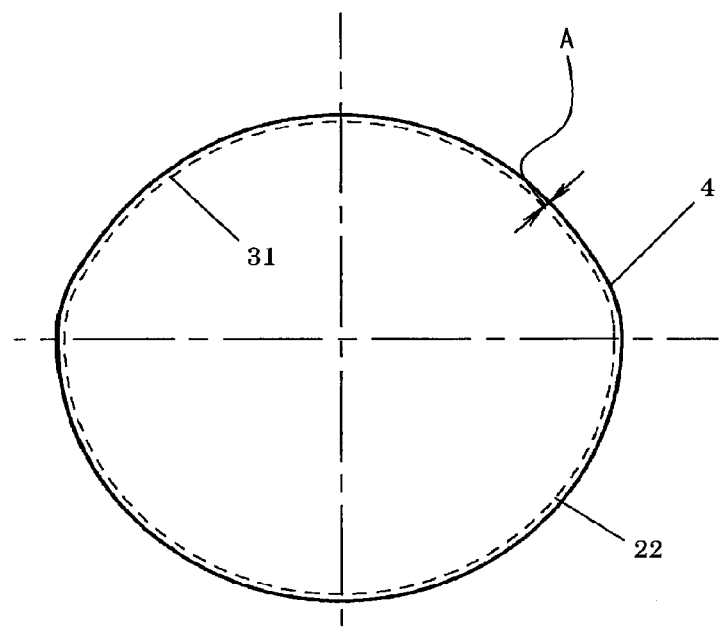
FIG. 3 is a conceptual diagram illustrating a relationship between a cross-sectional shape of the screw shaft and a shape of an inner circumferential edge of the seal member.

Here, a relationship between the cross-sectional shape of the screw shaft 4 and the shape of the inner circumferential edge of the seal member 22, that is, the shape of the inner circumferential edge of the lip portion 31 will be described. FIG. 3 is a conceptual diagram illustrating the relationship between the cross-sectional shape (hereinafter, the cross-sectional shape in the direction of the screw shaft 4 is simply referred to as the "cross-sectional shape of the screw shaft 4") of the screw shaft 4 in the direction orthogonal to the axial direction and the shape of the inner circumferential edge of the seal member 22. In FIG. 3, the cross-sectional shape of the screw shaft 4 is indicated by a solid line, and the shape of the inner circumferential edge of the seal member 22 is indicated by a dashed line. In the drawing, the shape of the inner circumferential edge of the seal member 22 in the state before the seal member is assembled to the screw shaft 4 is illustrated, and the cross-sectional shape of the screw shaft 4 and the shape of the inner circumferential edge of the seal member 22 are concentric. Moreover, in reality, the assembly of the seal member 22 with respect to the screw shaft 4 means that the nut 7 on which the seal member 22 is mounted is assembled to the screw shaft 4.

Since the rolling groove 13 is formed on the outer circumferential surface of the screw shaft 4, the cross-sectional shape of the screw shaft 4 is not a simple circle. As illustrated by the dashed line in FIG. 3, the shape of the inner circumferential edge of the seal member 22 before the seal member is assembled is similar to a shape in which the cross-sectional shape of the screw shaft 4 is reduced.

In a state where the seal member 22 is assembled to the screw shaft 4, that is, in a state where the screw shaft 4 is inserted into the inner diameter side of the sliding-contact portion 40 of the lip portion 31, the shape of the inner circumferential edge of the seal member 22 is matched to the shape of the outer circumferential surface of the screw shaft 4 in the circumferential direction. In other words, the shape of the inner circumferential edge of the seal member 22 coincides with the cross-sectional shape of the screw shaft 4. That is, the shape of the inner circumferential edge of the seal member 22 illustrated by the dashed line in FIG. 3 is enlarged until the shape of the inner circumferential edge coincides with the cross-sectional shape of the screw shaft 4 illustrated by the solid line. Specifically, the seal member 22 is elastically deformed, and the inner circumferential edge extends in the circumferential direction until the length dimension in the circumferential direction of the inner circumferential edge becomes the same as the length dimension in the circumferential direction of the cross-sectional shape of the screw shaft. That is, as illustrated in FIG. 3, when the cross-sectional shape of the screw shaft 4 and the shape of the inner circumferential edge of the seal member 22 before the assembly are set concentric and viewed from the axial direction, the section of the inner circumferential edge of the seal member 22 overlapping with the cross-section of the screw shaft 4 configures interference A of the seal member 22 with respect to the screw shaft 4.

With respect to an amount by which the inner circumferential edge of the seal member 22 extends in the circumferential direction when the seal member 22 is assembled to the screw shaft 4, an example of the specific dimensions will be described.

When the cross-sectional shape of the screw shaft 4 and the shape of the inner circumferential edge of the seal member 22 are approximately a circle, the approximate value of the amount by which the inner circumferential edge of the seal member 22 extends in the circumferential direction is able to be obtained from a simple calculation of a circumference length. That is, when the diameter of the screw shaft 4 is set to d and the width dimension of the interference is set to t, the approximate value of the amount by which the inner circumferential edge of the seal member 22 extends in the circumferential direction is represented by Expression: $\pi d - \pi(d-2t)$.

For example, when the diameter of the screw shaft 4 is set to 40 mm and the width dimension of the interference of the seal member 22 is set to 0.2 mm, the approximate value of the amount by which the inner circumferential edge extends in the circumferential direction is as follows. $40\pi - \pi(40 - 0.2 \times 2) \approx 1.26$ (mm)

In addition, when the same screw shaft 4 is used and the width dimension of the interference of the seal member 22 is set to 0.4 mm, the approximate value of the amount by which the inner circumferential edge extends in the circumferential direction is as follows.

$$40\pi - \pi(40 - 0.4 \times 2) \approx 2.51 \text{ (mm)}$$

In this way, the elongation of the inner circumferential edge of the seal member 22 is the dimension of millimeters, and thus, considering the size of the seal member 22, the elongation is a large elongation.

In the ball screw device 1 according to the present embodiment, even when the interference in which the inner circumferential edge of the seal member 22 is elongated by the above-described large amount is formed in the seal member 22, a configuration is obtained, which is capable of allowing the interference to be easily elastically deformable and suppressing the friction resistance of the seal member 22 without damaging seal properties of the seal member 22 with respect to the screw shaft 4. Specifically, an easily deformable portion, which is easily elastically deformable when the seal member 22 is assembled to the screw shaft 4, is formed on the lip portion 31 of the seal member 22. The easily deformable portion is configured to be more easily deformed than other sections of the lip portion 31. Hereinafter, the configuration of the easily deformable portion will be described.

In the present embodiment, as illustrated in FIGS. 2A and 2B, in the state before the seal member 22 is assembled, the predetermined section of the land sliding-contact portion 46 of the sliding-contact portion 40 and the section of the seal piece 37 of the lip portion 31 corresponding to the predetermined section is bent in the thickness direction of the seal member 22, that is, is bent to protrude to one side (in the present embodiment, to the outside in the axial direction, and the right side on the paper surface of FIG. 2B) in the axial direction of the nut 7 in the state where the seal member is assembled, and thus, a protrusion 55 is formed.

The bent section of the land sliding-contact portion 46 and the bent section of the seal piece 37 configure a pair of side surface portions 58 and 58 of the protrusion 55 opposing each other with respect to the straight line W, and a bottom portion 61 which connects one side end of each of the pair of side surface portions 58 and 58. Accordingly, as illustrated in FIG. 2B, the shape of the protrusion 55 when viewed from the radial direction is formed in an approximately U shape which is opened to the other side (the left side on the paper surface of FIG. 2B) in the axial direction. Specifically, the pair of the side surface portions 58 and 58 extends to be parallel from an opening on the other side in the axial direction to the one side in the axial direction, and ends of the one side in the axial direction are connected by the bottom portion 61 which extends in the direction orthogonal to the axial direction. The protrusion 55 is formed with respect to each of the pair of land sliding-contact portions 46.

In this way, since the protrusion 55 is formed in the cross-sectional shape having an approximately U shape, the protrusion is easily deformed in the direction in which the opening is widened, that is, the direction in which the opening side ends of the pair of the side surface portions 58 and 58 are separated from each other. Accordingly, in the present embodiment, the protrusion 55 having an approximately U shaped cross-section formed of the bent section of the land sliding-contact portion 46 and the bent section of the seal piece 37 configures the easily deformable portion. Hereinafter, the deformation of the protrusion 55 when the seal member 22 is assembled to the screw shaft 4 will be described.

As described with reference to FIG. 3, when the seal member 22 is assembled to the screw shaft 4, if the screw shaft 4 is inserted into the inner diameter side of the sliding-contact portion 40 of the lip portion 31, the sliding-contact portion 40 of the seal member 22 is elastically deformed and extends in the circumferential direction. In the present embodiment, the protrusion 55 which is the easily deformable portion is elastically deformed. The protrusion 55 is elastically deformed in the direction (the up-down direction on the paper surface of FIG. 2B) in which the opening having an approximately U shape is widened. Specifically, the protrusion 55 is deformed in the direction in which the opening side ends of the pair of side surface portions 58 and 58 are separated from each other. In other words, the bent section of the land sliding-contact portion 46 and the bent section of the seal piece 37 configuring the protrusion 55 are deformed to extend. If the protrusion 55 is deformed in this way, the cross-sectional shape of the protrusion 55 when viewed from the radial direction is formed in an approximately trapezoid shape having the opening side as a long bottom side and the bottom portion 61 side as a short bottom side, and the bottom portion 61 is moved to be approximately parallel to the opening side to be closer to the opening side than the state before the seal member is assembled.

When the seal member 22 in this state is viewed from the axial direction of the nut 7, compared to the state before the seal member is assembled, in the shape of the inner circumferential edge of the seal member 22, since each of the pair of the land sliding-contact portions 46 and 46 extends in the circumferential direction, the entire shape of the inner circumferential edge is enlarged. At this time, the section of the lip portion 31 other than the easily deformable portion, that is, the elastic deformation of the groove sliding-contact portion 43 and the section of the land sliding-contact portion 46 other than the protrusion 55 is not as large as the easily deformable portion. That is, the shape of the inner circumferential edge of the seal member 22 is enlarged until the shape of the inner circumferential edge coincides with the cross-sectional shape of the screw shaft 4 mainly due to the elastic deformation of the easily deformable portion. The seal member 22 is elastically deformed in this way, and thus, is assembled to the screw shaft. In addition, when the protrusion 55 is viewed from the radial direction, the land sliding-contact portion 46 other than the easily deformable portion, the pair of side surface portions 58 and 58, and the bottom portion 61 are able to be deformed until they form approximately one linear shape.

In this way, in the present embodiment, the elastic deformation of the seal member 22 is mainly performed by the easily deformable portion which is easily deformed, that is, the protrusion 55. Accordingly, even when the interference with respect to the screw shaft 4 is provided on the seal member 22, the seal member 22 is easily deformed, the seal properties of the lip portion 31 are not damaged, and the friction resistance with respect to the screw shaft 4 of the seal member 22 is able to be suppressed.

In addition, in the present embodiment, the reason why the easily deformable portion is formed on the land sliding-contact portion 46 of the sliding-contact portion 40 of the lip portion 31 is as follows. That is, the cross-section shape of the sliding-contact portion 40 is approximately a circle, the size of the sliding-contact portion is formed to be larger than the thickness of the end of the seal piece 37 and smaller than the width of the rolling groove 13 of the screw shaft 4, and thus, the sliding-contact portion 40 has a relatively complicated shape. Since the groove sliding-contact portion 43 of the sliding-contact portion 40 comes into sliding-contact with the rolling groove 13 on which the balls 10 roll, the groove sliding-contact portion exerts reliable and stable seal performance by the complicated shape and prevents intrusion of foreign matter. Accordingly, if the seal member is elastically deformed when the seal member is assembled and extends in the circumferential direction and the shape of the groove sliding-contact portion 43 is changed, there is a concern that the seal performance may be changed. On the other hand, even when the land sliding-contact portion 46 extends to be elastically deformed when the seal member is assembled and the shape is changed, the change of the seal performance is smaller than that of the groove sliding-contact portion 43. Accordingly, the easily deformable portion is formed on the land sliding-contact portion 46 of the sliding-contact portion 40 of the lip portion 31.

Next, modification examples of the present embodiment will be described. With respect to each modification example, configurations different from the present embodiment will be mainly described, and the configurations similar to the present embodiment will be described with reference to FIGS. 1 to 3 using the same reference numerals.

First, a ball screw device according to a first modification example of the present embodiment will be described. The ball screw device according to the present modification example is different from the embodiment in that the configurations of the easily deformable portions of the seal members are different from each other. Other configurations of the present modification example are similar to the embodiment.

Figures 4A, 4B:
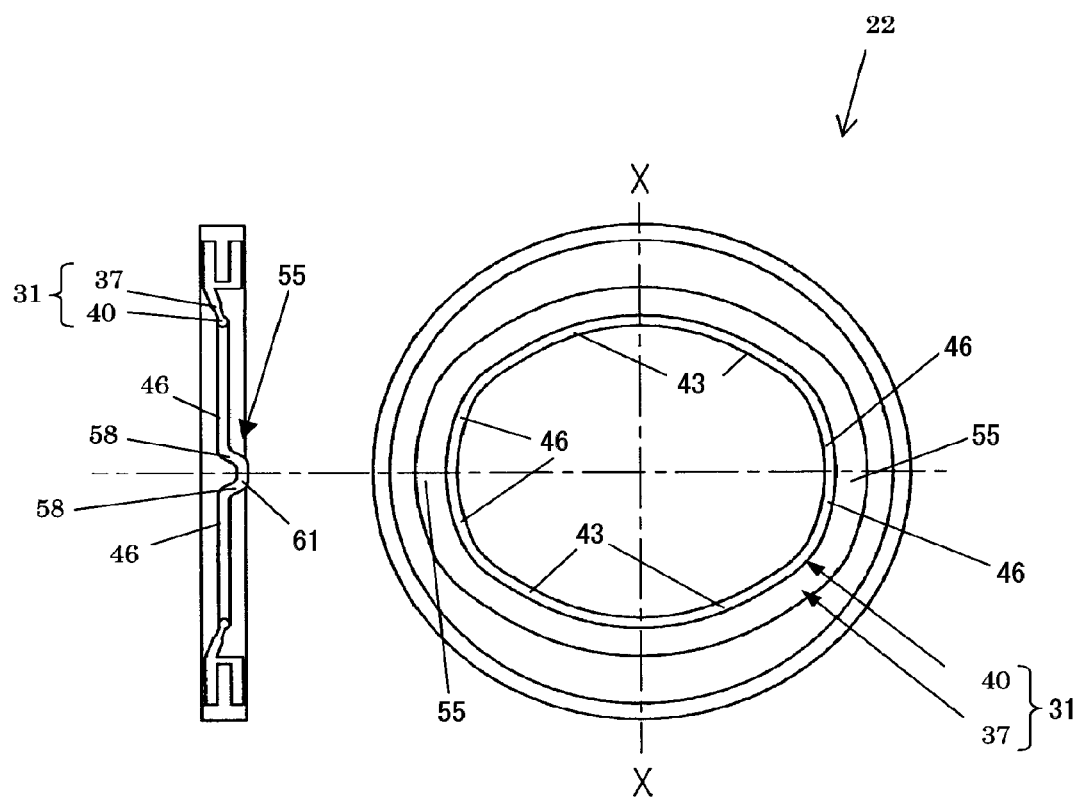
FIGS. 4A and 4B are standalone views of a seal member of a ball screw device according to a first modification example.

FIGS. 4A and 4B are standalone views of a seal member 22 of a ball screw device according to the first modification example of the present embodiment, FIG. 4A is an outline view of the screw shaft 4 when viewed from an axial direction, and FIG. 4B is a cross-sectional view taken along line X-X of FIG. 4A.

As illustrated in FIGS. 4A and 4B, the easily deformable portion of the seal member 22 according to the present modification example is a protrusion 55 in which a predetermined section of a land sliding-contact portion 46 of a sliding-contact portion 40 and the section of a seal piece 37 of a lip portion 31 corresponding to the predetermined section is formed to be bent in the thickness direction of the seal member 22, that is, to be bent to protrude to one side (the right side on the paper surface of FIG. 4B) in the axial direction of the nut 7 in the state where the seal member is assembled. The bent section of the land sliding-contact portion 46 and the bent section of the seal piece 37 configure a pair of side surface portions 58 and 58 of the protrusion 55 opposing each other with respect to the straight line W (refer to FIG. 2A), and a bottom portion 61 which connects one side end of each of the pair of side surface portions 58 and 58.

In the present modification example, the pair of side surface portions 58 and 58 are inclined to be closer to each other atone side ends in the axial direction. Moreover, the cross-sectional shape of the protrusion 55 when viewed from the radial direction is an approximately bowl shape. Specifically, the one side ends of the pair of side surface portions 58 and 58 and the bottom portion 61 are smoothly continued with each other, and the other side ends of the pair of side surface portions 58 and 58 and the section of the land sliding-contact portion 46 are smoothly continued with each other.

Similar to the embodiment, also in the present modification example, the elastic deformation of the seal member 22 is mainly performed by the easily deformable portion which is easily deformed, that is, the protrusion 55. Accordingly, even when the interference with respect to the screw shaft 4 is provided on the seal member 22, the seal member 22 is easily deformed, the seal properties of the lip portion 31 are not damaged, and the friction resistance with respect to the screw shaft 4 of the seal member 22 is able to be suppressed.

Next, a ball screw device according to a second modification example of the present embodiment will be described. The ball screw device according to the present modification example is different from the embodiment in that the configurations of the easily deformable portions of the seal members are different from each other. Other configurations of the present modification example are similar to the embodiment.

Figure 5A:
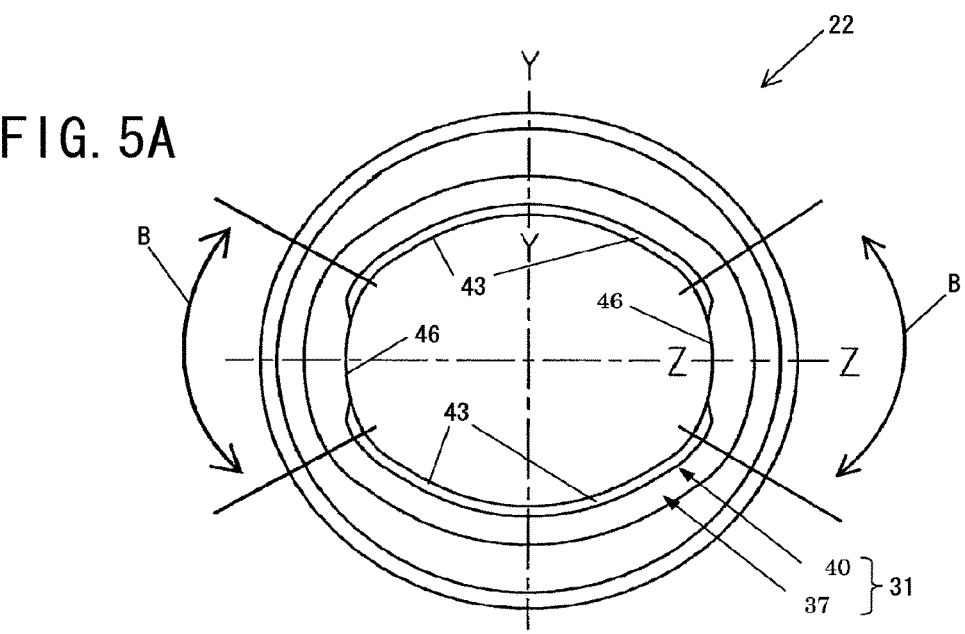
FIGS. 5A to 5C are standalone views of a seal member of a ball screw device according to a second modification example.
Figure 5B:
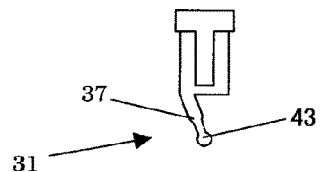
Figure 5C:
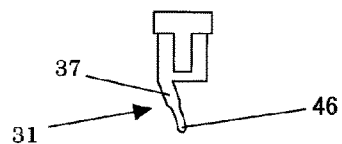

FIGS. 5A to 5C are standalone views of a seal member 22 of the ball screw device according to the second modification example, FIG. 5A is an outline view of the screw shaft 4 when viewed from an axial direction, FIG. 5B is a cross-sectional view taken along line Y-Y of FIG. 5A, and FIG. 5C is a cross-sectional view taken along line Z-Z of FIG. 5A.

In the present modification example, in the configuration of a sliding-contact portion 40 of a lip portion 31, a shape of a groove sliding-contact portion 43 and a shape of a land sliding-contact portion 46 are different from each other. As illustrated in FIG. 5B, the configuration of the groove sliding-contact portion 43 is similar to that of the embodiment. That is, the cross-section of the groove sliding-contact portion 43 is an approximate circle having a larger diameter than the thickness dimension of the inner diameter side end of the seal piece 37. On the other hand, as illustrated in FIG. 5C, the configuration of the land sliding-contact portion 46 is a semi-circular shape which is formed on the inner diameter side end of the seal piece 37. The semi-circular shape of the land sliding-contact portion 46 is formed in a semicircle having a smaller diameter than the diameter of the circle in the cross-section of the groove sliding-contact portion 43. Moreover, the diameter dimension of the semi-circular shape is the same as or is smaller than the dimension in the thickness direction of the inner diameter side end of the seal piece 37.

In this way, the cross-sectional shape of the land sliding-contact portion 46 is formed to be smaller than the cross-sectional shape of the groove sliding-contact portion 43. In other words, the land sliding-contact portion 46 is a small diameter portion of the sliding-contact portion 40, and the groove sliding-contact portion 43 is a large diameter portion of the sliding-contact portion 40. In addition, as illustrated in of FIGS. 5B and 5C, the cross-sectional area of the land sliding-contact portion 46 is configured to be smaller than the cross-sectional area of the groove sliding-contact portion 43.

In the present modification example, the land sliding-contact portion 46 which is the small diameter portion of the sliding-contact portion 40 configures the easily deformable portion. That is, since the cross-sectional area of the land sliding-contact portion 46 is configured to be smaller than the cross-sectional area of the groove sliding-contact portion 43, the land sliding-contact portion 46 is more easily deformed than the groove sliding-contact portion 43. When the seal member 22 is assembled to the screw shaft 4, if the screw shaft 4 is inserted into the inner diameter side of the sliding-contact portion 40 of the lip portion 31, the land sliding-contact portion 46 is elastically deformed and extends in the circumferential direction (approximately up-down direction in (a) of FIG. 5). Accordingly, compared to the state before the seal member 22 is assembled, the entire shape of the inner circumferential edge of the seal member 22 is enlarged.

In this way, similar to the embodiment, also in the present modification example, the elastic deformation of the seal member 22 is mainly performed by the easily deformable portion which is easily deformed, that is, the land sliding-contact portion 46 which is the small diameter portion of the sliding-contact portion 40. Accordingly, even when the interference with respect to the screw shaft 4 is provided on the seal member 22, the seal member 22 is easily deformed, the seal properties of the lip portion 31 are not damaged, and the friction resistance with respect to the screw shaft 4 of the seal member 22 is able to be suppressed.

In addition, the land sliding-contact portion 46 and the groove sliding-contact portion 43 of the sliding-contact portion 40 are not necessarily formed to exactly match the range within which the sliding-contact portion 40 comes into sliding-contact with the land of the screw shaft 4 in reality and the range within which the sliding-contact portion 40 comes into sliding-contact with the rolling groove 13 in reality. In reality, the shape of the sliding-contact portion 40 in the range within which the sliding-contact portion 40 comes into sliding-contact with the rolling groove 13 may be the large diameter portion. That is, as illustrated in FIG. 5A, both ends in a range B within which the sliding-contact portion comes into sliding-contact with the land may be the large diameter portion.

Next, a ball screw device according to a third modification example of the present embodiment will be described. In the present modification example, a seal member, which is used in the ball screw device having one line of rolling groove 13, will be described. Moreover, the overall configuration of the ball screw device according to the present modification example is different from the embodiment only in that the present modification example has one line of rolling groove 13, other configurations are similar to the embodiment, and thus, the configuration with respect to the ball screw device is omitted.

Figure 6A:
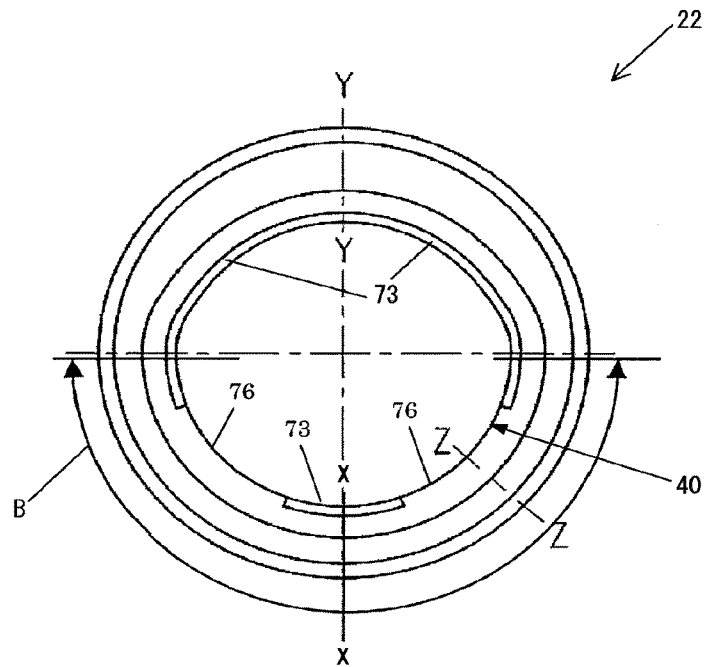
FIGS. 6A to 6C are standalone views of a seal member of a ball screw device according to a third modification example.
Figure 6B:
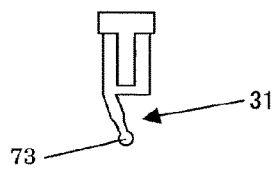
Figure 6C:
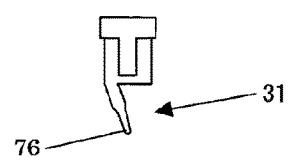

FIGS. 6A to 6C are standalone views of a seal member 22 of a ball screw device according to the third modification example, FIG. 6A is an outline view of the screw shaft 4 when viewed from an axial direction, FIG. 6B is a cross-sectional view taken along line Y-Y of FIGS. 6A and 6C is a cross-sectional view taken along line Z-Z of FIG. 6A.

In the seal member 22 according to the present modification example, as illustrated in FIG. 6A, a range of approximately a half portion of the entire circumference of the sliding-contact portion 40 is the section (the range B within which the sliding-contact portion comes into sliding-contact with the land) which comes into sliding-contact with the land of the screw shaft 4, and the remaining section is the range within which the sliding-contact portion comes into sliding-contact with the rolling groove 13. As illustrated in of FIG. 6B, the configuration of the sliding-contact portion 40 in the range within which the sliding-contact portion comes into sliding-contact with the rolling groove 13 is similar to the configuration of the groove sliding-contact portion of the second modification example. That is, the configuration of the sliding-contact portion 40 in the range within which the sliding-contact portion comes into sliding-contact with the rolling groove 13 is a large diameter portion 73 of the sliding-contact portion 40.

The configuration of the sliding-contact portion 40 in the range within which the sliding-contact portion 40 comes into sliding-contact with the land of the screw shaft 4 is a configuration in which the configuration similar to the groove sliding-contact portion, that is, the large diameter portion 73, and the configuration of the land sliding-contact portion of the second modification example, that is, the small diameter portion 76 of the sliding-contact portion 40 are combined. That is, a portion of the sliding-contact portion 40 in the range within which the sliding-contact portion 40 comes into sliding-contact with the land becomes the large diameter portion 73. Specifically, as illustrated in FIG. 6A, a predetermined range over both sides in the circumferential direction from the center portion in the range within which the sliding-contact portion comes into sliding-contact with the land is the large diameter portion 73, and both sides in the circumferential direction of the large diameter portion 73 become small diameter portions 76. In addition, the cross-sectional view taken along line X-X of FIG. 6A is similar to FIG. 6B.

In the present modification example, the small diameter portion 76 of the sliding-contact portion 40 configures the easily deformable portion. That is, since the cross-sectional area of the small diameter portion 76 is smaller than the cross-sectional area of the large diameter portion 73, the smaller diameter portion is more easily deformed than the large diameter portion 73. When the seal member 22 is assembled to the screw shaft 4, if the screw shaft 4 is inserted into the inner diameter side of the sliding-contact portion 40 of the lip portion 31, the small diameter portion 76 of the sliding-contact portion 40 is elastically deformed and extends in the circumferential direction. Accordingly, compared to the state before the seal member 22 is assembled, the entire shape of the inner circumferential edge of the seal member 22 is enlarged.

In addition, in the present modification example, the entire area of the range within which the sliding-contact portion 40 comes into sliding-contact with the land is not the easily deformable portion, that is, the small diameter portion 76, and two sections in the land sliding-contact range are the easily deformable portions. This is because the seal properties of the seal member 22 are too low when the entire area of the land sliding-contact range is the easily deformable portion. Moreover, compared to when the entire area of the land sliding-contact range is the easily deformable portion, when the easily deformable portion is set to two sections, the seal properties are able to be uniform in the circumferential direction.

In this way, similar to the embodiment, also in the present modification example, the elastic deformation of the seal member 22 is mainly performed by the easily deformable portion which is easily deformed, that is, the small diameter portion 76 of the sliding-contact portion 40. Accordingly, even when the interference with respect to the screw shaft 4 is provided on the seal member 22, the seal member 22 is easily deformed, the seal properties of the lip portion 31 are not damaged, and the friction resistance with respect to the screw shaft 4 of the seal member 22 is able to be suppressed.

Second Embodiment

Hereinafter, a second embodiment of the ball screw device of the present invention will be described in detail.

As described above, the ball screw device is a device which includes the nut in which the rolling grooves are formed on the inner circumferential surface, the screw shaft in which the rolling grooves are formed on the outer circumferential surface, and balls which are disposed between track grooves formed of the rolling grooves of the nut and the rolling grooves of the screw shaft.

Since the ball of the ball screw device rolls on the rolling groove according to the rotary motion of the screw shaft, if foreign matter such as dust or abrasion powder adhering to the screw shaft enters the nut, the rolling motion of the ball may be inhibited by the foreign matter entering the nut, and thus, damage such as seizure may occur. Accordingly, in order to prevent the intrusion or the like of the foreign matter into the nut, a ring shaped seal member is disposed on both ends in the axial direction of the nut. Moreover, leakage of the lubricant in the nut is suppressed by the seal member, and thus, the lubrication state in the nut is secured.

As the seal member of the ball screw device, there are a contact seal in which the tip portion of the seal member comes into contact with the outer circumferential surface and the rolling groove of the screw shaft in the elastic deformation state, and a non-contact seal in which the tip portion does not come into contact with the outer circumferential surface and the rolling groove of the screw shaft. The contact seal has higher dust resistance and lubricant sealing performance than the non-contact seal.

The rolling groove of the screw shaft of the ball screw device is ground in a finishing process. At this time, in order to prevent the seizure between a grindstone and the surface of the rolling groove or the deformation of the screw shaft due to heating, generally, a grinding clearance groove is formed on the rolling groove of the screw shaft. However, when the grinding clearance groove is provided on the rolling groove of the screw shaft of the ball screw device in which the contact seal is provided, the grinding clearance groove becomes a gap, and thus, the dust resistance and the lubricant sealing performance of the contact seal are decreased.

With respect to this, JP 2001-193815 A discloses that the intrusion prevention of the foreign matter in the contact seal is securely performed without providing the grinding clearance groove on the rolling groove of the screw shaft of the ball screw device in which the contact seal is provided.

However, when the grinding clearance groove is not provided on the rolling groove of the screw shaft, other measures are required to prevent the seizure between the grindstone and the surface of the rolling groove or the deformation of the screw shaft due to the heating when the grinding is performed, and thus, compared to when the grinding clearance groove is provided, the management is complicated, and the processing cost is increased.

Accordingly, the present embodiment provides a ball screw device capable of securing improved dust resistance and lubricant sealing performance by a contact seal in the ball screw device which includes the contact seal and in which the grinding clearance groove is formed on the rolling groove of the screw shaft.

Figure 7:
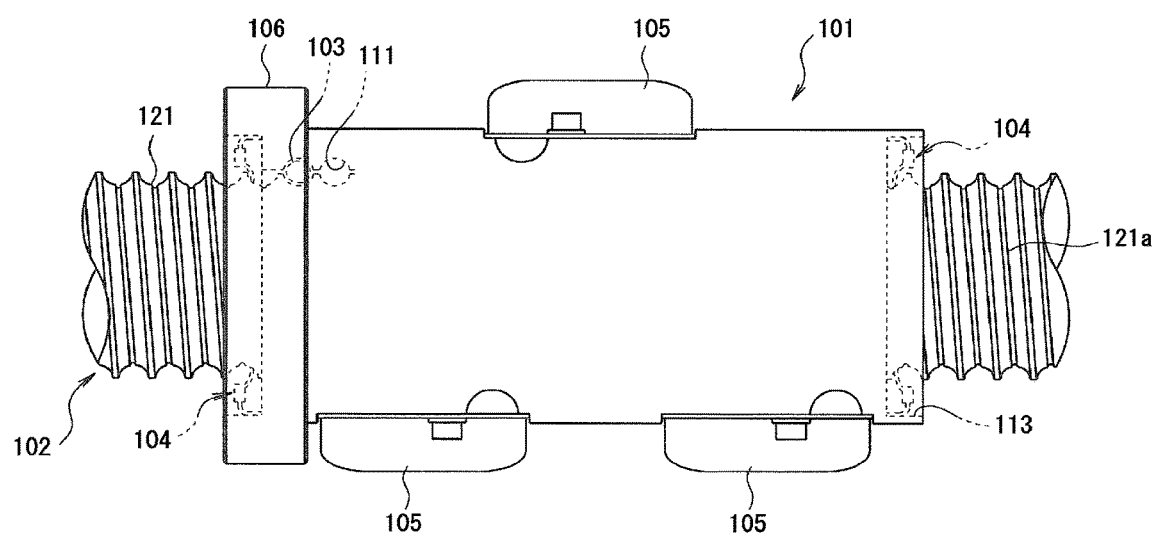
FIG. 7 is a view illustrating an outline in a second embodiment of the ball screw device of the present invention.

FIG. 7 is a view illustrating an outline of the ball screw device of the present embodiment.

The ball screw device includes a nut 101, a screw shaft 102, balls 103, a seal member 104, and a return tube 105. Rolling grooves 111 are formed on the inner circumferential surface of the nut 101. Rolling grooves 121 are formed on the outer circumferential surface of the screw shaft 102. A grinding clearance groove 121a is formed on the rolling groove 121.

The ball 103 is disposed between track grooves formed of the rolling groove 111 of the nut 101 and the rolling groove 121 of the screw shaft 102. Each of the seal members 104 has a ring shape, and the seal members are disposed on both ends in the axial direction of the inner portion of the nut 101. The return tube 105 returns the ball 103 from the end point of the track groove to the starting point via the outside, and in this example, since the number of circuits is three, three return tubes are provided. Moreover, although it is not illustrated, in the nut 101, one greasing hole is formed on each circuit, and discharging holes are formed on both ends in the axial direction.

Figure 8:
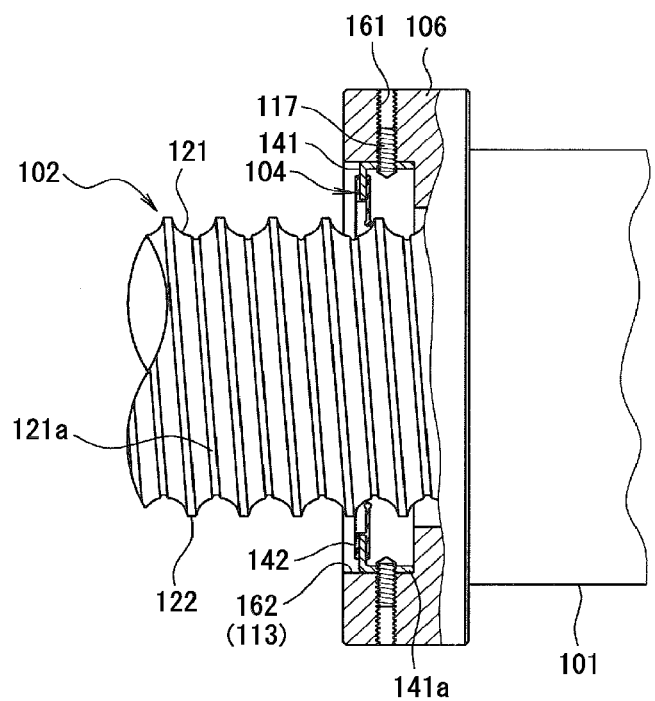
FIG. 8 is a view in which an outward flange is partially cut in the ball screw device of FIG. 7.

An outward flange 106 is formed on one end in the axial direction of the nut 101. FIG. 8 is a view in which the outward flange 106 is partially cut. As illustrated in FIG. 8, a plurality of threaded holes 161 penetrating in the radial direction is formed on the outward flange 106 in the circumferential direction, and the seal member 104 is fixed to one end in the axial direction of the nut 101 by screws 117 screwed to the threaded holes 161. Similar threaded holes are also formed on the other end in the axial direction of the nut 101, and the seal member 104 is fixed to the other end in the axial direction of the nut 106 by the screws screwed to the threaded holes.

Figure 9:
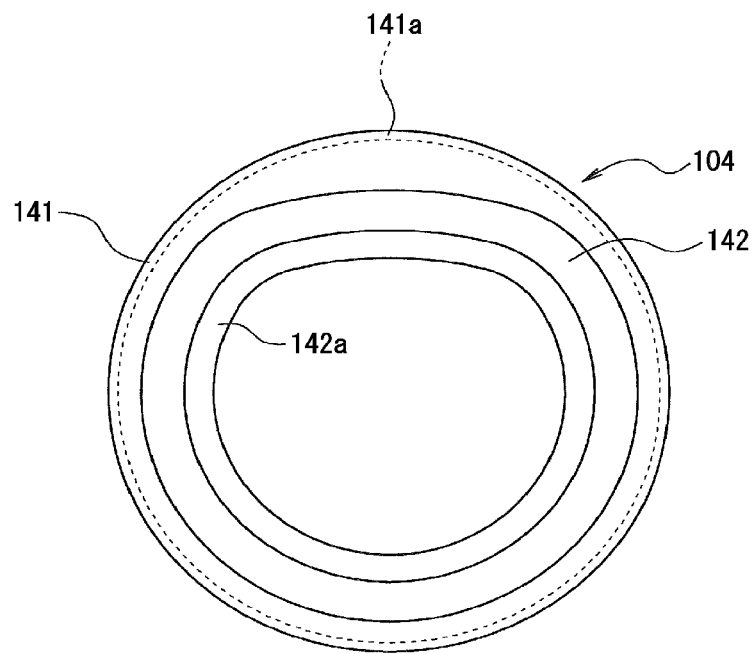
FIG. 9 is a front view of the seal member of the ball screw device of FIG. 7.

FIG. 9 is a front view of the seal member 104. The seal member 104 includes a core metal 141 and a lip portion 142. The core metal 141 of the seal member 104 includes an edge portion 141a which is fixed to the inner circumferential surface 113 (the inner circumferential surface 162 of the outward flange 106 in the one end side in the axial direction) of the nut 106. The edge portion 141a of this example is formed in a shape in which the outer circumferential portion of the disk-shaped core metal 141 is bent to be perpendicular to the plate surface. The lip portion 142 includes a tip portion 142a of the lip portion which comes into contact with the outer circumferential surface 122 and the rolling groove 121 of the screw shaft 102 in an elastic deformation state. The cross-section of the tip in the tip portion 142a of the lip portion is an arc shape. Moreover, in the present embodiment, the outer circumferential portion of the core metal 141 is set to be the fitting portion, which is fitted to the inner circumferential surface of the nut 106 on which the outward flange is formed.

Figure 10:
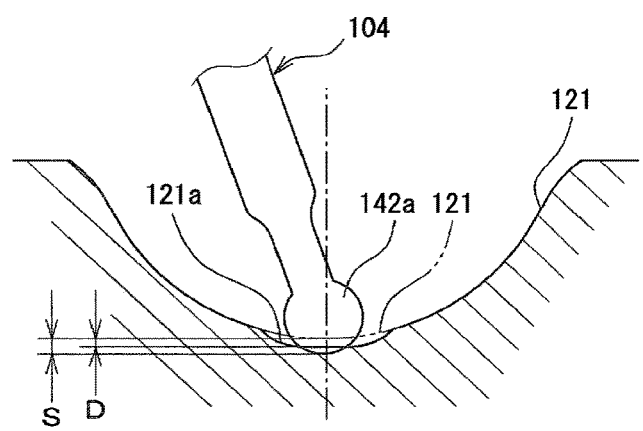
FIG. 10 is a view describing a relationship between a rolling groove and a grinding clearance groove of the screw shaft, and the seal member in the ball screw device of the second embodiment.

As illustrated in FIG. 10, the cross-sectional shape of the grinding clearance groove 121a is a shape in which arc shaped lines extend to both sides of a linear line indicating the bottom surface.

In addition, a depth D of the grinding clearance groove 121a formed on the rolling groove 121 of the screw shaft is set to be smaller than the interference S of the seal member 104 with respect to the screw shaft. Accordingly, since the seal member 104 also comes into contact with the grinding clearance groove 121a in an elastic deformation state, improved dust resistance and lubricant seal performance by the seal member 104 are able to be secured.

Figure 11:
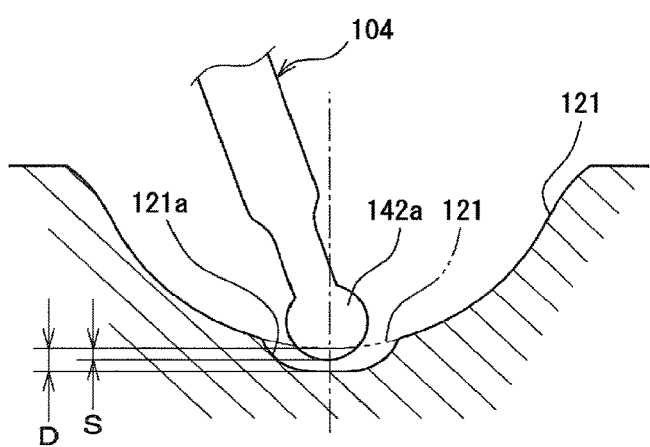
FIG. 11 is a view describing a relationship between a rolling groove and a grinding clearance groove of a screw shaft, and a seal member in the ball screw device of a comparative example.

On the other hand, as illustrated in FIG. 11, if the depth D of the grinding clearance groove 121a formed on the rolling groove 121 of the screw shaft is set to be larger than the interference S of the seal member 104 with respect to the screw shaft, the seal member 104 does not come into contact with the grinding clearance groove 121a, and thus, the dust resistance and the lubricant sealing performance by the seal member 104 are decreased.

Figure 12:
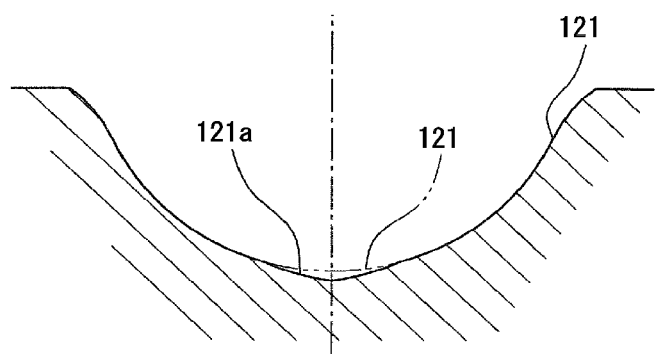
FIG. 12 is a cross-sectional view illustrating the rolling groove of the screw shaft, and is a view illustrating an example in which the shape of the grinding clearance groove is different from that of FIG. 10.

Moreover, in addition to the shape illustrated in FIG. 10, the cross-sectional shape of the grinding clearance groove 121a may be a shape in which a boundary between the grinding clearance groove 121a and the rolling groove 121 is chamfered in the shape illustrated in FIG. 10 or a shape in which an arc (arc shaped portion) is provided on the boundary in the shape illustrated in FIG. 10. Moreover, as illustrated in FIG. 12, the cross-sectional shape of the grinding clearance groove 121a may be a gothic arc shape.

Third Embodiment

Hereinafter, a third embodiment of the ball screw device of the present invention will be described in detail.

Here, in the related art, when the seal member of the ball screw device is manufactured, designing and machining the seal member considering the shape of the grinding clearance groove of the rolling groove of the screw shaft requires effort. This is because the rolling groove is formed in a helical track, and thus, the shape of the rolling groove should be considered in a three-dimensional manner. In addition, generally, since the rolling groove and the grinding clearance groove are separately machined, deviation between the rolling groove and the grinding clearance groove easily occurs. Accordingly, even when the shape of the seal member is matched to the shape of the grinding clearance groove, a gap is generated due to the deviation, and thus, there is still room for improvement.

Therefore, in the present embodiment, even when the shape of the grinding clearance groove is not reflected to the shape of the seal member, the gap between the seal member 204 and the grinding clearance groove 221a is not generated, and the seal performance is not damaged. As an example of the specific configuration, an aspect is provided, in which the shape of the seal member 204 is determined to match the shape of the rolling groove 221 on which the grinding clearance groove 221a is not provided.

In addition, since the rolling groove 221 of the screw shaft and the seal member 204 come into inclined contact with each other as illustrated in FIG. 1, the seal member 204 does not seal a thin groove such as the grinding clearance groove 221a, and the gap is not easily generated. In addition, since the inclination of the groove is increased as the lead is increased, this tendency becomes remarkable as the lead is increased.

Figure 15:
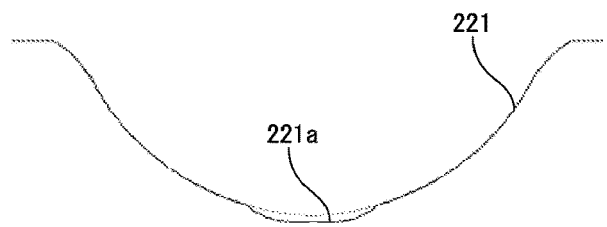
FIG. 15 is a cross-sectional view when only the depth of the grinding clearance groove is decreased and is less than or equal to the interference of the seal member in a third embodiment of the ball screw device of the present invention.
Figure 16:
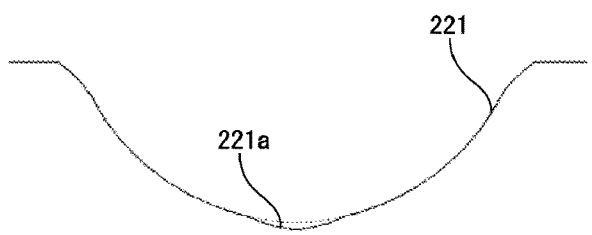
FIG. 16 is a cross-sectional view of the grinding clearance groove having the gothic arc shape in the third embodiment of the ball screw device of the present invention.

Therefore, as in the above-described second embodiment, it is effective that the depth of the grinding clearance groove 221a is set to be less than or equal to the interference of the seal member 204 (refer to FIG. 15). According to this aspect, the gap generated between the seal member 204 and the grinding clearance groove 221a is able to be removed. In this case, it is not necessary to match the shape of the seal member 204 with the shape of the grinding clearance groove 221a. In addition, it is also effective that the interference of the section of the seal member 204 coming into contact with the grinding clearance groove 221a is increased by approximately 0.03 mm to 0.4 mm.

In addition, in the present embodiment, ball screw devices described in the following (1) and (2) are provided. Moreover, the interference of the seal member means a tightening amount of the seal member.

(1) An angle θ at which the rolling groove and the grinding clearance groove come into contact with each other is set to be equal to or more than 155°.

Figure 13:
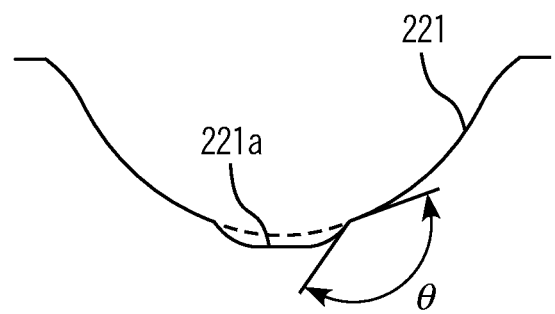
FIG. 13 is a cross-sectional view illustrating a shape of a grinding clearance groove of the related art of which the cross-sectional shape is configured of a straight line and an arc.

Since the seal member 204 easily follows the grinding clearance groove 221a, the angle θ at which the grinding clearance groove 221a and the rolling groove 221 come into contact with each other in the cross-section along the axial direction is set to be equal to or more than 155° (refer to FIG. 13). Accordingly, the seal member 204 easily follows the grinding clearance groove 221a and comes into close contact with the grinding clearance groove 221a, and thus, it is possible to prevent the seal properties in the section of the grinding clearance groove 221a from being decreased. This is effective in a case where the lead is small. However, the effect is increased as the lead of the ball screw device is increased.

(2) The cross-sectional shape of the grinding clearance groove is set to a gothic arc shape.

Figure 14A:
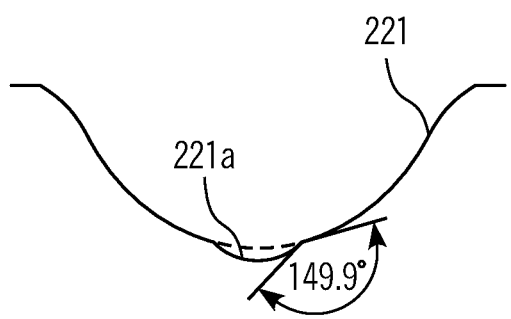
FIG. 14A illustrates the cross-sectional shape of the grinding clearance groove having a single arc shape and the cross-sectional shape when the grinding clearance groove is deepened by machining errors.
Figure 14B:
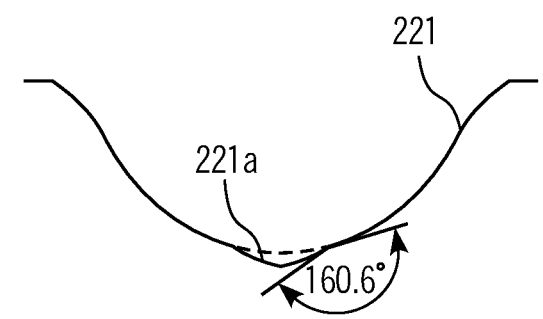
FIG. 14B illustrates the cross-sectional shape of the grinding clearance groove having a gothic arc shape and the cross-sectional shape when the grinding clearance groove is deepened by machining errors.
Figure 14B:
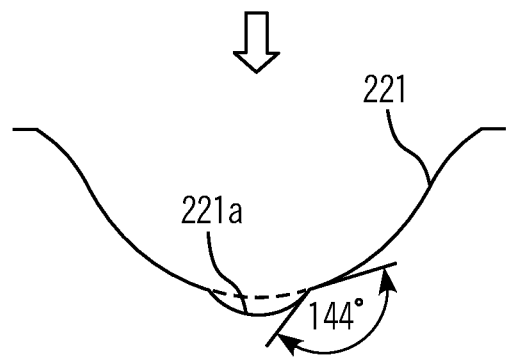
Figure 14B:
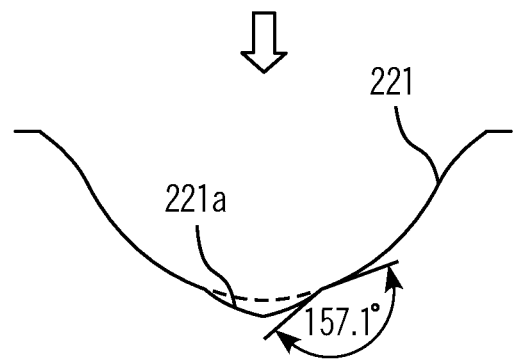

According to this aspect, in addition to the effect of (1), a manageable groove shape is able to be achieved. For example, FIG. 14A illustrates a case where a grinding clearance groove having a general grinding clearance groove shape (the cross-section is a single arc shape) is deepened by machining errors. Moreover, FIG. 14B illustrates a case where a grinding clearance groove having a gothic arc shaped cross-section is deepened by the machining errors. Compared to the grinding clearance grooves illustrated in of FIGS. 14A and 14B, when the grinding clearance groove 221a is deepened, the angle at which the rolling groove 221 and the grinding clearance groove 221a come into contact with each other is more greatly decreased in the shape of the grinding clearance groove 221a illustrated in FIG. 14A than in the shape of the grinding clearance groove 221a illustrated in FIG. 14A. In addition, it is understood that the contact angle of the gothic arc shape is larger than that of the single arc shape if the depths are the same as each other. FIG. 13 is also the shape (the cross-sectional shape is configured of the straight line and the arc) of the grinding clearance groove 221a of the related art, and compared to the shape of FIG. 13 and the gothic arc shape, similar advantages are obtained.

In this way, by forming the grinding clearance groove 221a to the gothic arc shape, the contact angle is able to be easily increased, and thus, the ball screw device is not easily influenced by the machining errors. Moreover, generally, since the rolling groove of the ball screw device has the gothic arc shape, it has an experience as a cutting tip, and thus, availability is improved. Accordingly, the gothic arc shape is a shape having high practical use.

Figure 17:
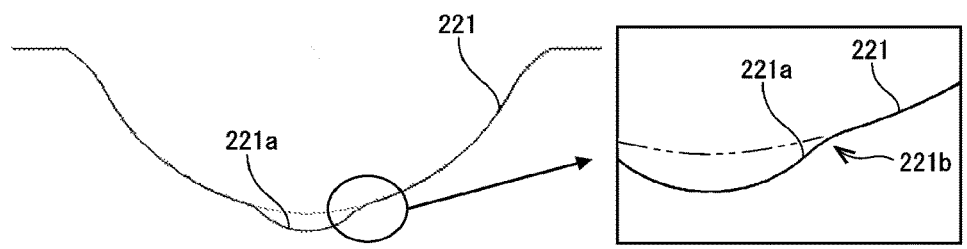
FIG. 17 is a cross-sectional view of the grinding clearance groove forming a single arc cross-section in the third embodiment of the ball screw device of the present invention.

Moreover, in the present embodiment, as illustrated in FIG. 17, the grinding clearance groove 221a has a single arc cross-section, and a boundary 221b between the rolling groove 221 and the grinding clearance groove 221a may be smoothly connected in an arc shape.

By forming the boundary 221b to the arc shape, effects in which damage of a seal lip by the edge is prevented and the seal member 204 easily follows the grinding clearance groove 221a are exerted.

Moreover, the shape of the seal member 204 of the ball screw device and the tip shape of the seal member 204 of the present embodiment are considered as follows.

Figures 18A, 18B, 18C:
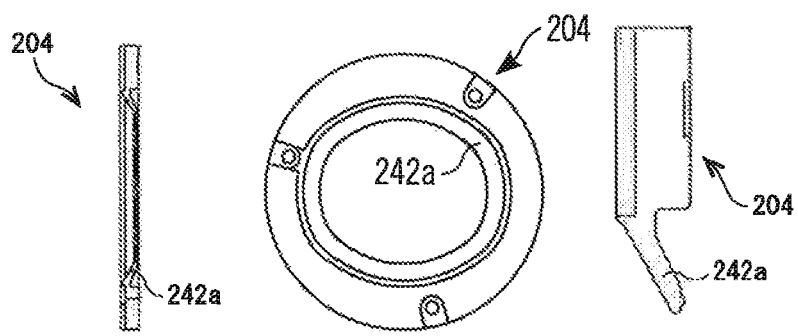
FIGS. 18A to 18C are views illustrating an example of the shape of the seal member in the third embodiment of the ball screw device of the present invention.
Figures 19A, 19B, 19C:
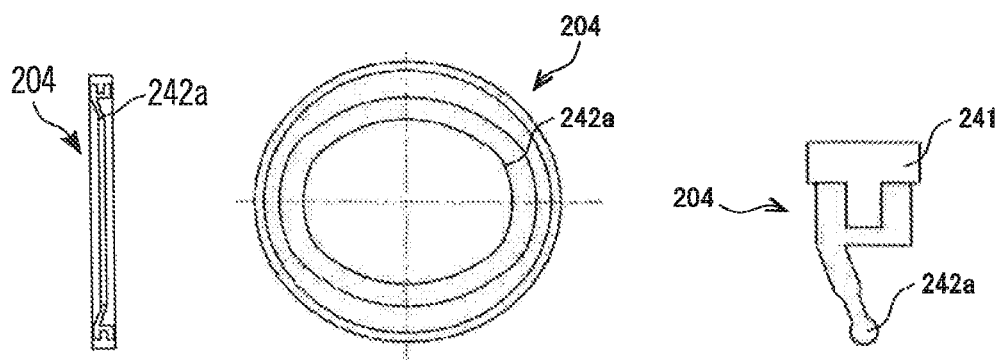
FIGS. 19A to 19D are views illustrating an example of the shape of the seal member in the third embodiment of the ball screw device of the present invention.
Figure 19D:
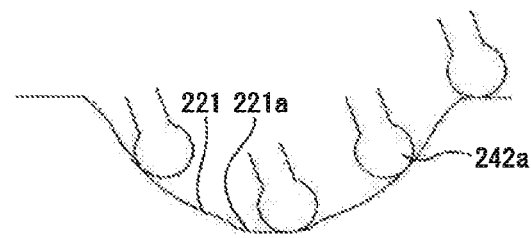

First, as illustrated in FIGS. 18A to 18C, a tip portion 242a of the lip portion of the seal member 204 may be inclined, and the tip of the seal member 204 may have minute circular protrusions in the downward direction and the rightward direction. Pressure from the rightward direction is increased due to the inclination, and thus, seal properties are able to be increased.

In addition, as illustrated in FIGS. 19A to 19D, in the seal member 204, the tip of the tip portion 242a of the inclined lip portion may have a ball shape. By forming the tip of the tip portion 242a of the lip portion in a ball shape, even when the tip portion comes into contact with the groove in any direction, the contact becomes a contact between the ball and the surface, and thus, seal properties are not changed according to the contact location. In addition, the contact pressure is able to be approximately uniform. Moreover, since the contact position of the seal member 204 of the ball screw device is changed according to the location at which the seal member abuts the screw shaft, the above-described shape is preferable. In addition, a constricted shape in the vicinity of the tip portion of the seal member 204 decreases the contact force of the seal member 204 and has an effect of decreasing the contact resistance of the seal member 204.

Moreover, as illustrated in FIGS. 20A to 20C, in the seal member 204, the cross-sectional shape of the tip portion is an arc shape, and effects similar to the aspect illustrated in FIGS. 19A to 19D are exerted. In addition, a lip is provided on the section to which the seal member 204 strongly abuts, the seal stiffness is partially increased, and the seal performance is increased. In the seal member of FIGS. 20A to 20C, the vicinity of the tip is inclined. However, as illustrated in FIGS. 21A and 21B, the tip portion of the seal member 204 does not necessarily need to be inclined.

FIG. 22 illustrates a case where two seal members 204 illustrated in FIGS. 19A to 19D overlap with each other and are assembled to the nut 201. In this case, the seal member 204 inclined toward the outside of the nut 201 plays a role of dust prevention, and the seal member 204 inclined toward the inside of the nut plays a role of decreasing leakage of the lubricant. In addition, as a method for fixing the seal member 204, there is a method which covers a ring shaped face plate on the seal member 204 and presses the seal member 204 and the face plate by the edge of the washer in a small screw with a washer, and a method which presses the seal member 204 and the face plate by a set screw. According to this aspect, only the force in the direction pressed to the seal member 204 is able to be applied over the entire circumference of the seal member 204, and thus, the deformation of the seal member 204 is able to be suppressed. This is particularly effective in a case where a core 241 of the seal member is made of a resin and the strength is decreased.

Figure 23:
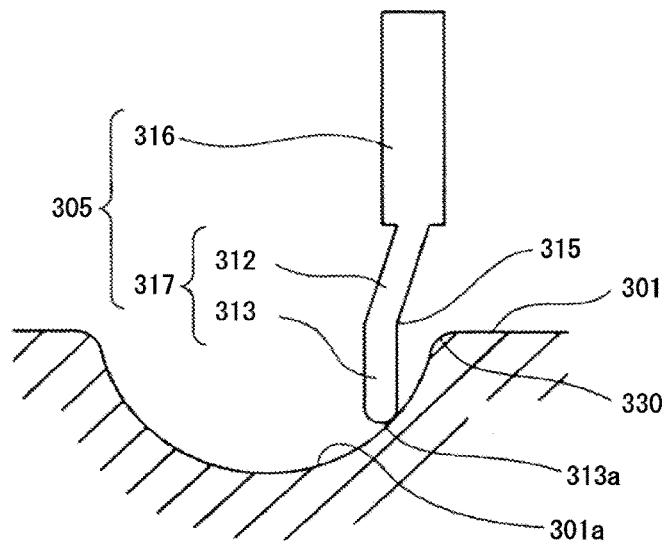
FIG. 23 is a cross-sectional view (a cross-sectional view along the axial direction of the screw shaft) illustrating an example of the shape of the seal member.

In addition, as illustrated in FIG. 23, a seal member 305 may include an annular portion 316 and a lip portion 317 positioned inside the annular portion, and the lip portion 317 may be configured of an inclined portion 312 which is continued to the inside in the radial direction of the annular portion 316, and a bending portion 313 which is bent from the inclined portion and further extends inwardly in the radial direction. The cross-sectional shape of a tip 313a of the bending portion 313 is an arc shape. By forming the cross-sectional shape in the arc shape, the influence of the contact angle of the surface of the screw shaft coming into sliding-contact with the seal member with respect to the seal performance is able to be decreased. A bending point 315 forms the boundary between the inclined portion 312 and the bending portion 313.

The inclined portion 312 has an angle of inclination with respect to a surface perpendicular to the axial direction of the screw shaft 301, and the bending portion 113 is bent at the bending point 315 and extends in a direction in which the angle of inclination is decreased. Preferably, the angle of inclination is set to 0 and is perpendicular to the axial direction of the screw shaft 301. According to this configuration, the lip portion 317 avoids an end of a land 330 of the screw shaft 301 and the tip 313a comes into contact with the inner portion of the rolling groove 301a, and thus, a decrease in the seal performance due to unintentional contact is able to be prevented.

In addition, compared to when the entire lip portion 317 extends in the direction perpendicular to the axial direction, when the inclined portion 312 is provided, the stiffness with respect to the force toward the outside in the radial direction is decreased. Accordingly, an external force is applied to a rolling screw, and even when a pressing amount with respect to the screw shaft 301 of the lip portion 317 is not uniform, the lip portion 317 is able to follow the screw shaft. Accordingly, it is possible to prevent seal torque from being increased, and stable seal performance is able to be exerted.

Moreover, if the inclined portion 312 is provided, the stiffness when the screw shaft is screwed from the tip side of the inclined portion 312 is higher than the stiffness when the screw shaft is screwed from the root side of the inclined portion 312. Accordingly, the force pressing the bending portion 313 of the lip portion 317 to the screw shaft 301 is larger in the case of the former than in the case of the latter, and the seal properties are increased. In this way, directivity is applied to the seal, and thus, an effective seal is able to be obtained. For example, in order to prevent the intrusion of dust from the outside, the bending portion of the lip portion 317 is disposed to be positioned outside the nut. In addition, in order to prevent the leakage of grease from the inner portion of the nut, the bending portion 313 of the lip portion 317 is disposed to be positioned inside the nut. Accordingly, the sealing is able to be achieved while the seal torque is suppressed.

Figure 24:
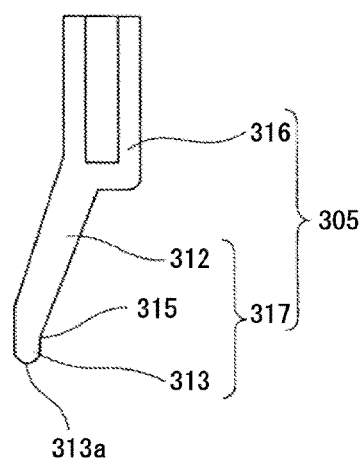
FIG. 24 is a cross-sectional view (a cross-sectional view along the axial direction of the screw shaft) illustrating an example of the shape of the seal member.
Figure 25:
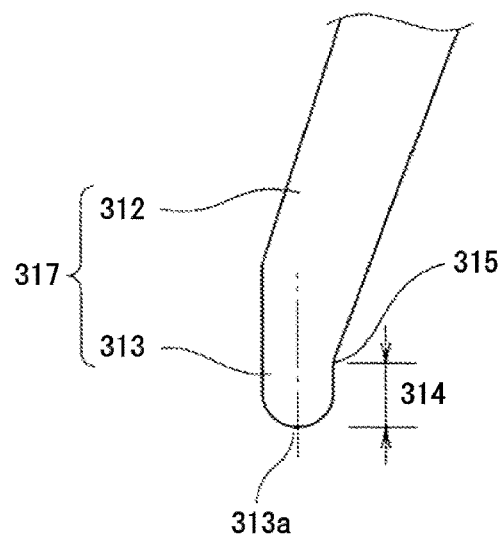
FIG. 25 is a cross-sectional view along the axial direction of the screw shaft for describing a length of a tip portion of FIG. 24.

Moreover, as illustrated in FIGS. 24 and 25, in the seal member 305, the lip portion 317 may be configured of the inclined portion 312 which extends to the inside in the radial direction from the annular portion 316, and the bending portion 313 which is bent at the bending point 315 inside the inclined portion and further extends to the inner side in the radial direction. The cross-sectional shape of the tip 313a in the bending portion 313 is an arc shape. Differences between this aspect and the aspects illustrated in FIG. 23 are that the length of the bending portion 313 is shorter than the length of the inclined portion 312, and the length of the bending portion 313 is shorter than the diameter of the rolling element used in the rolling screw, in this aspect.

Figure 26:
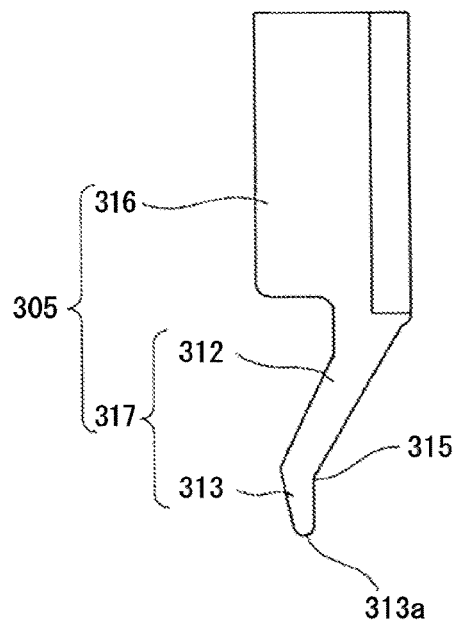
FIG. 26 is a cross-sectional view (a cross-sectional view along the axial direction of the screw shaft) illustrating an example of the shape of the seal member.

Moreover, as illustrated in FIG. 26, the lip portion 317 of the seal member 305 may be configured of the inclined portion 312 which extends from the annular portion 316 to the inner side in the radial direction, and the bending portion 313 which further extends in the same direction from the inclined portion 312. The cross-sectional shape of the tip 313a in the bending portion 313 is an arc shape. A difference between this aspect and the aspects illustrated in FIGS. 23 to 25 is that the bending portion 313 is gradually thinned toward the tip 313a and the diameter of the arc shape of the tip 313a is smaller. When the tip 313a is formed in the arc shape, there is an advantage that the influence of the contact angle of the surface of the screw shaft coming into sliding-contact with the seal member with respect to the seal performance is able to be decreased.

Figure 27:
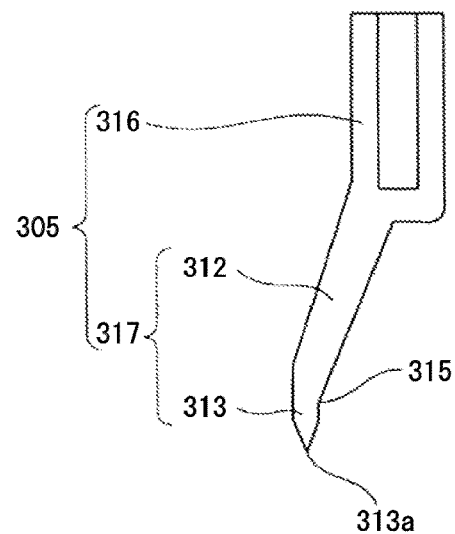
FIG. 27 is a cross-sectional view (a cross-sectional view along the axial direction of the screw shaft) illustrating an example of the shape of the seal member.

In addition, as illustrated in FIG. 27, the lip portion 317 of the seal member 305 may be configured of the inclined portion 312 which extends from the annular portion 316, and a bending portion 313 which is bent from the inclined portion 312 and further extends. A difference between this aspect and the aspects illustrated in FIGS. 23 to 26 is that the cross-sectional shape of the bending portion 313 is a sharpened shape, and the tip 313a comes into line-contact with the surface of the rolling groove. Accordingly, compared to the arc shape, it is possible to prevent foreign matter from entering the gap between the lip end and the surface of the screw shaft and passing through the seal, and thus, higher seal performance is able to be exerted.

Figure 28:
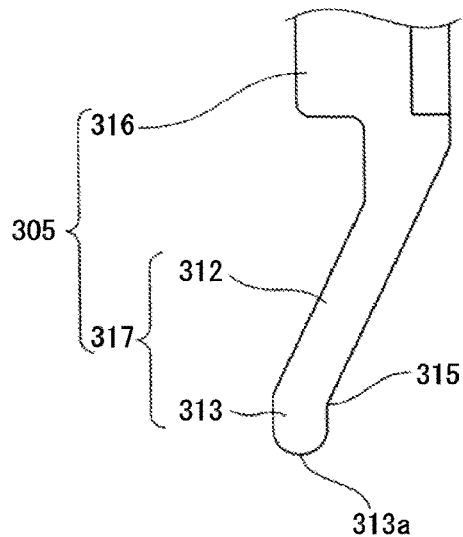
FIG. 28 is a cross-sectional view (a cross-sectional view along the axial direction of the screw shaft) illustrating an example of the shape of the seal member.

Moreover, as illustrated in FIG. 28, the lip portion 317 of the seal member 305 may be configured of the inclined portion 312 which extends from the annular portion 316, and the bending portion 313 which further extends from the inclined portion 312. A difference between this aspect and the aspects illustrated in FIGS. 23 to 27 is that the cross-sectional shape of the bending portion 313 is a polygonal shape in this aspect. Accordingly, compared to the arc shape, it is possible to prevent foreign matter from entering the wedge-shaped gap between the lip end and the surface of the screw shaft and passing through the seal member. Moreover, compared to when the tip 313a is formed in a sharpened shape, there is an advantage that the influence of the contact angle of the surface of the screw shaft coming into sliding-contact with the seal member with respect to the seal performance is able to be decreased.

<Material of Seal Portion and Lip Portion>

Here, as a material of at least one of the seal member 305 and the lip portion 317, various elastomers are able to be used. Among the elastomers, a thermoplastic elastomer is preferable. As the thermoplastic elastomer, styrene-based thermoplastic elastomer, olefin-based thermoplastic elastomer, thermoplastic elastomer vinyl chloride, polyester-based thermoplastic elastomer, polyurethane-based thermoplastic elastomer, nylon-based thermoplastic elastomer, or the like may be used. Preferably, olefin-based thermoplastic elastomer is used.

As a material of at least one of the seal member 305 and the lip portion 317, various rubbers are able to be used. Specifically, natural rubber or synthetic rubber is able to be used. Among the rubbers, the synthetic rubber is preferable. As the synthetic rubber, acrylonitrile butadiene rubber, hydrogenated acrylonitrile butadiene rubber, chloroprene rubber, styrene butadiene rubber, isoprene rubber, ethylene propylene rubber, urethane rubber, silicon rubber, fluoro-rubber, acrylic rubber, or the like may be used. If necessary, various fillers or additive agents may be added. Preferably, fluororubber is used.

<Material of Core>

In addition, a material of the core (core metal) includes a cold rolled mild steel plate-steel strip (SPCC defined by JIS G 3341), a hot rolled mild steel plate-steel strip (SPHC defined by JIS G 3131), or a hot rolled stainless steel plate-steel strip (SUS304 or SUS316 defined by JIS G 4302 or JIS G 4307).

Fourth Embodiment

Hereinafter, a fourth embodiment of the ball screw device of the present invention will be described in detail.

As described above, the ball screw device is a linear motion device which is configured to include the screw shaft, the nut, and the plurality of balls. Opposing helical rolling grooves are formed on the outer circumferential surface of the screw shaft and the inner circumferential surface of the nut. Moreover, the circulation track of the balls is configured of the rolling grooves, the balls roll on the circulation track, and thus, the nut linearly moves to be relative with respect to the screw shaft.

Then, in the usage of this kind of ball screw device, there is a usage environment in which various kinds of dust such as iron powder or wood chips is fluttered. Accordingly, considering a life span or operating performance of the ball screw device, dustproof measures under the usage environment are essential. Therefore, as the dustproof measures, the seal member is provided on the end of the nut, the screw shaft comes into contact with the seal inner circumferential surface of the seal member, intrusion of the foreign matter from the outside into the circulation track is prevented, and a seal having a labyrinth structure or the like is used for the seal member. Moreover, in the seal member, in addition to the dustproof measures, in order to improve lubricity of the ball screw device, lubricant maintaining measures such as a retention property of grease in the nut or splash prevention of grease are also required as the seal function.

Here, in the operation in which the seal member is assembled to the end of the nut of the ball screw device, generally, phase adjustment in which the inner circumferential shape of the seal member and the rolling groove are matched with each other is performed. However, in this operation, since the positioning is determined by repeating trial and error, it takes a significantly long time.

Figure 37:
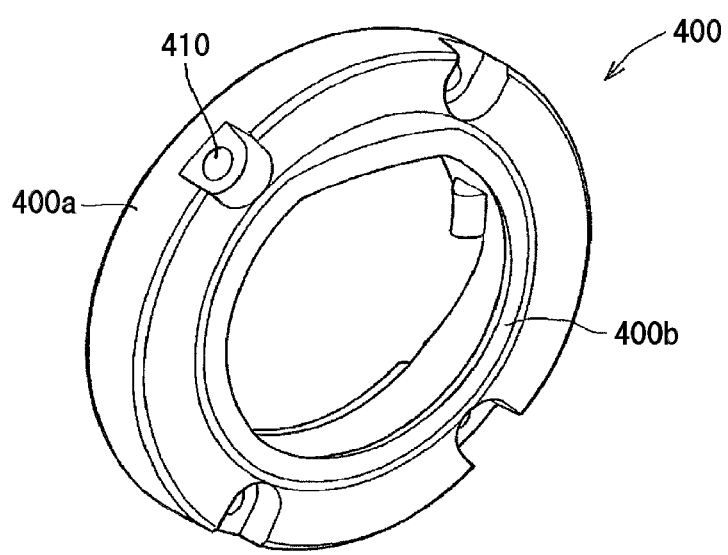
FIG. 37 is a perspective view illustrating a configuration of an end plate installed on a rolling device of the related art.

Accordingly, WO 2009/041190 discloses a technology which fixes an end plate 1100 including a seal member 1100b on an end of an outer member (not illustrated) corresponding to the nut (refer to FIG. 37). According to PTL 1, the end plate 1100 includes an end plate main body portion 1100a and the seal member 1100b which is installed to come into sliding-contact with the inner member without a gap. In addition, a plurality of threaded holes 1110 penetrating in the axial direction are provided on the end plate main body portion 1100a, and the end plate main body portion 1100b is fixed to the inner member via the threaded holes 1110 by a fixing member (not shown) such as a bolt and is positioned.

However, the technology disclosed in WO 2009/041190 is not adopted to avoid the deformation of the seal member, to provide the threaded holes on the nut (inner member), or the like. As a result, there is a problem that compactness of the seal member is not obtained or the like.

Therefore, an object of the present embodiment is to provide a ball screw device capable of being simply and securely positioned on an end of a nut without deforming the seal member.

Figure 29A:
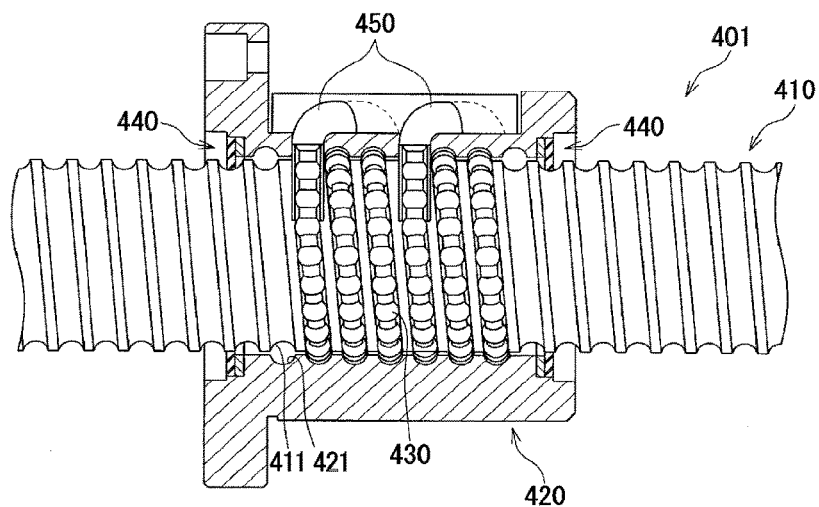
FIGS. 29A and 29B are views illustrating a configuration of a fourth embodiment of the ball screw device according to the present invention.
Figure 29B:
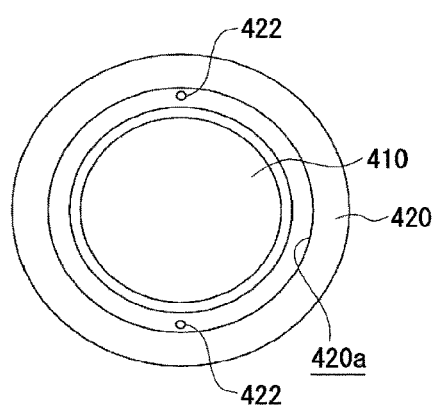
Figure 30:
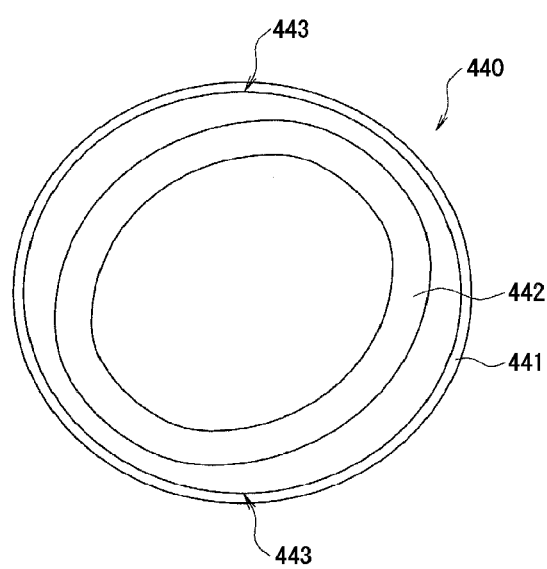
FIG. 30 is a front view illustrating a configuration of a seal member in a fourth embodiment of the ball screw device according to the present invention.
Figure 32A:
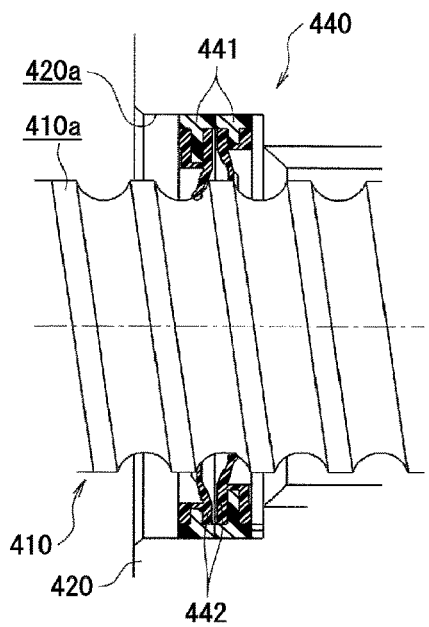
FIGS. 32A and 32B are views illustrating a state where the seal member in the fourth embodiment of the ball screw device according to the present invention is mounted.
Figure 32B:
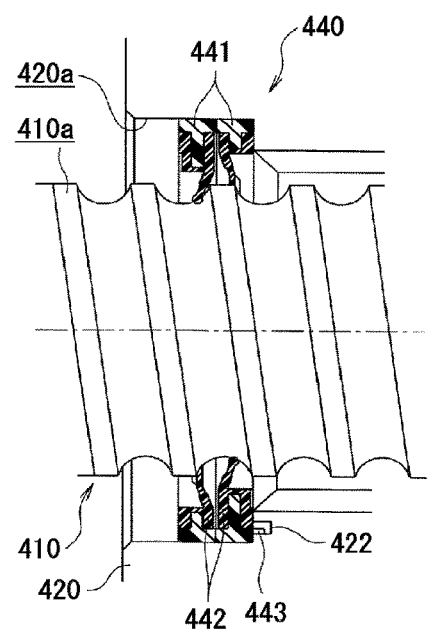
Figure 33A:
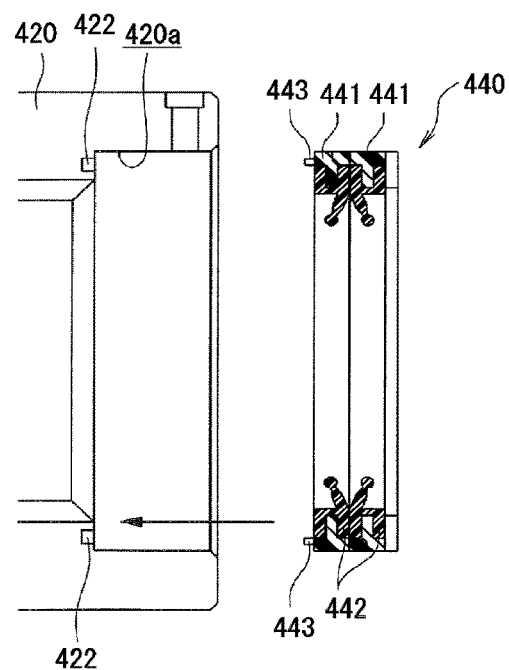
FIGS. 33A and 33B are views illustrating a mounting method of the seal member in the fourth embodiment of the ball screw device according to the present invention.
Figure 33B:
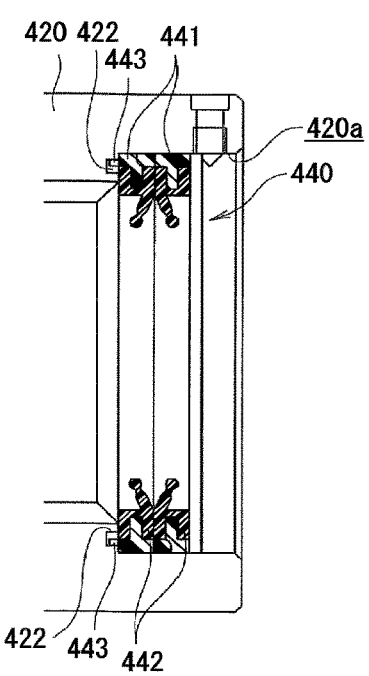

FIG. 29A and FIG. 29B are cross-sectional views along an axial direction illustrating a configuration of the ball screw device of the present embodiment. In addition, FIG. 30 is a front view illustrating a configuration of a seal member of the ball screw device of the present embodiment. FIGS. 31A to 31D are perspective views illustrating an example of the shape of a convex portion of the seal member of the ball screw device according to the present embodiment. FIGS. 32A and 32B are views illustrating a state when the seal member of the ball screw device of the present embodiment is mounted, FIG. 32A is a partial cross-sectional view along the axial direction illustrating a state where a convex portion is hooked to an end of an inner circumferential surface of the nut, and FIG. 32B is a partial cross-sectional view along the axial direction illustrating a state where the convex portion is fitted to a concave portion. In addition, FIGS. 33A and 33B are views illustrating a mounting method of the seal member in the ball screw device of the present embodiment, FIG. 33A is a partial cross-sectional view along the axial direction before the seal member is mounted, and FIG. 33B is a partial cross-sectional view along the axial direction after the seal member is mounted. FIGS. 34A and 34B are views illustrating a state where a screw shaft in which a grinding clearance groove is provided on the screws shaft of the ball screw device of the present embodiment is adopted and the seal member is mounted, FIG. 34A is a partial cross-sectional view along the axial direction illustrating a state where the convex portion is hooked to the end of the inner circumferential surface of the nut, and FIG. 34B is a partial cross-sectional view along the axial direction illustrating a state where the convex portion is fitted to the concave portion. FIGS. 35A and 35B is a view illustrating a mounting method of the seal member in which the lip portion is positioned in a direction different from that of the lip portion of the seal member illustrated in FIG. 33A and FIG. 33B in the ball screw device of the present embodiment, FIG. 35A is a partial cross-sectional view along the axial direction before the seal member is mounted, and FIG. 35B is a partial cross-sectional view along the axial direction after the seal member is mounted.

<Ball Screw Device>

As illustrated in FIG. 29, a ball screw device 401 includes a screw shaft 410, a nut 420, a plurality of balls 430, and a seal member 440.

The screw shaft 410 includes helical rolling grooves 411 on the outer circumferential surface, and helical rolling grooves 421 are formed on the inner circumferential surface of the nut 420, which is provided on the outer circumference of the screw shaft 410 and has a cylindrical shape, by the same lead as that of the rolling groove 411.

The rolling grooves 411 and 421 oppose each other, the screw shaft 410 is relatively rotated with respect to the nut 420, and thus, the plurality of balls 430 provided between the rolling grooves 411 and 421 roll between the rolling grooves 411 and 421. In addition, for example, the balls 430 rolling between the rolling grooves 411 and 421 pass through a ball return tube 450 assembled to the nut 420 and are returned to the original positions. The portions between the rolling grooves 411 and 421 and the ball return tube 450 form the rolling paths.

<Seal Member>

As illustrated in FIG. 30, the seal member 440 includes an annular main body portion 441, and the tip portion 442 of a lip portion which is provided on the inner circumferential surface of the main body portion 441 and protrudes to the inner portion. One or more convex portions 443 protruding in at least one of the axial direction and the radial direction are provided on the main body portion 441.

[Convex Portion]

Figure 31A:
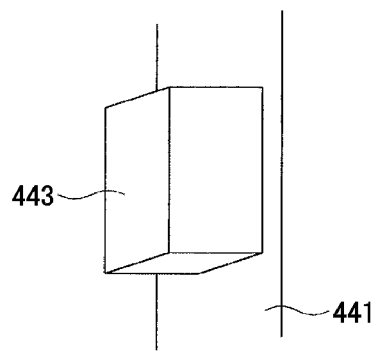
FIGS. 31A to 31D are perspective views illustrating an example of the shape of a convex portion of the seal member in the fourth embodiment of the ball screw device according to the present invention.
Figure 31B:
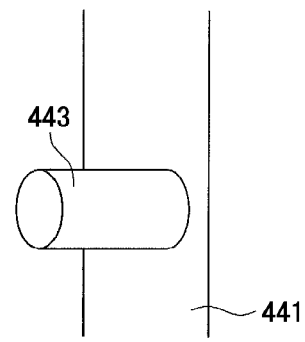
Figure 31C:
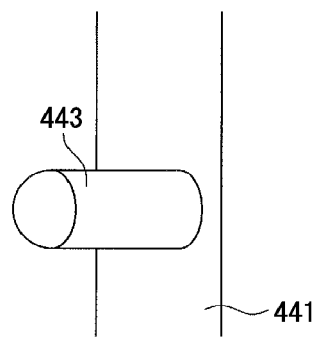
Figure 31D:
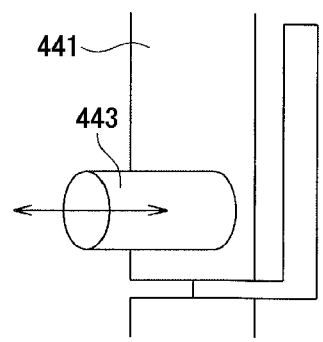

Here, for example, the shape of the convex portion 443 includes a rectangular shape illustrated in FIG. 31A, a columnar shape having a curve surface illustrated in FIGS. 31B and 31C, and a configuration having elasticity illustrated in of FIG. 31D. Among these, by chamfering the tip portion of the convex portion 443 as illustrated in FIG. 31C, an insertion property with respect to the concave portion 422 described below is able to be improved. Moreover, according to the convex portion 443 having elasticity illustrated in FIG. 31D, even when the convex portion 443 strikes the end of the inner circumferential surface of the nut 420 as illustrated in FIG. 32A, a biasing force is absorbed, and the positioning of the seal member 440 is able to be smoothly performed.

In addition, the convex portion 443 may be integrated with the seal member 440, and a pin may be erected to the seal member 440. Moreover, the installation position of the convex portion 443 is not limited to the vicinity of the outer circumference of the seal member 440.

In addition, in the state where the screw shaft 410 penetrates the nut 420, the convex portion 443 may be provided to protrude in the radial direction of the seal member 440 if the assembly of the seal member 440 is not inhibited.

<Concave Portion>

One or more concave portions 422 are provided on the end of the inner circumferential surface of the nut 420 according to the disposition of the convex portion 443 in the main body portion 441 when the axial direction of the nut 420 and the axial direction of the seal member 440 are set in approximately the same direction as each other. In addition, the shape of the concave portion 422 is able to be freely changed according to the shape of the convex portion 443 illustrated in FIGS. 31A to 31D.

<Mounting of Seal Member>

Next, a mounting procedure of the seal member 440 will be described with reference to FIGS. 33A and 33B.

As illustrated in FIGS. 33A and 33B, the direction in which the convex portion 443 of the seal member 440 protrudes opposes the direction in which the concave portion 422 is opened, the convex portion 443 and the concave portion 422 are fitted to each other, the tip portion 442 of the lip portion protrudes to the inner side toward the rolling groove of the screw shaft 410, and the seal member 440 is fitted onto the inner circumferential surface of the nut. In this way, the seal member 440 mounted on the nut 420 seals the gap between the screw shaft 410 and the nut 420.

Here, in the ball screw device 401 of the present embodiment, the seal member 440 is able to be assembled in any of the states where the nut 420 is removed from the screw shaft 410 and the state where the screw shaft 410 penetrates the nut 420. For example, when the convex portion 443 is provided to protrude in the radial direction of the seal member 440, since the seal member 440 is not able to be turned and inserted into the nut, the seal member 440 is not able to be assembled in the state where the screw shaft 410 penetrates the nut 420. In this case, the nut 420 to which the seal member 440 is assembled is inserted into the screw shaft 410. However, at this time, the tip portion 442 of the lip portion may be damaged or deformed.

However, in the ball screw device 401 of the present embodiment, if the tip portion 442 of the lip portion is formed of a rubber material or the like, the seal member 440 escapes even when the convex portion 443 strikes the end surface of the inner circumferential surface of the nut 420 as illustrated in FIG. 32A, and thus, the seal member 440 enters the nut when the convex portion 443 is brought to the position of the concave portion 422. Accordingly, the seal member 440 is able to be assembled even when the screw shaft 410 penetrates the nut 420.

Particularly, as illustrated in FIGS. 32A and 32B, when two seal members 440 are installed to be overlapped with each other, since the posture of the seal member 440 with respect to the screw shaft 410 is stable, the nut 420 is turned, and the seal member 440 easily enters the nut, and the assembly operation of the seal member 440 is easily performed even in the state where the screw shaft 410 penetrates the nut 420.

According to this configuration, the positioning in the phase direction of the seal member with respect to the nut is able to be simply and securely performed. Particularly, since the configuration has the simple structure in which only the convex portion and the concave portion are provided, a compact and inexpensive ball screw device is able to be provided. In addition, since a load is not applied to the seal member, deformation of the seal member does not occur.

As described above, since the convex portion 443 and the concave portion 422 are provided, the ball screw device 401 of the present embodiment provides a ball screw device capable of simply and securely positioning the seal member 440 on the end of the inner circumferential surface of the nut 420 without deforming the seal member 440.

Fifth Embodiment

Figure 36:
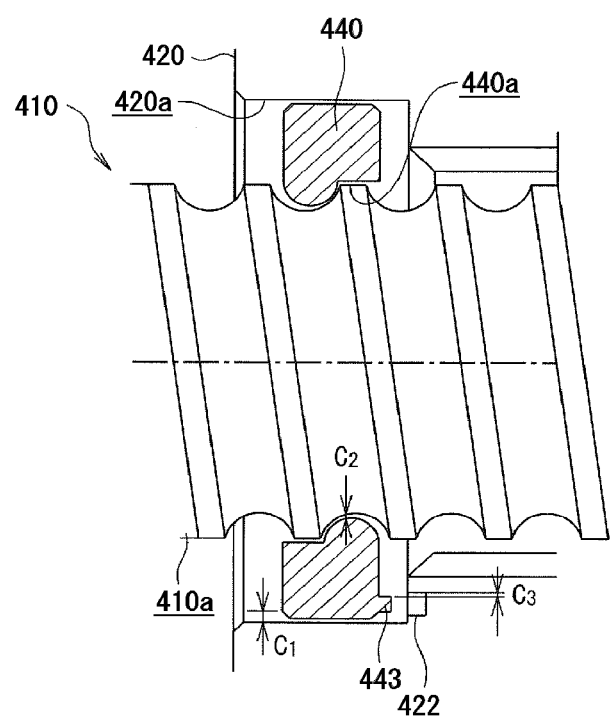
FIG. 36 is a cross-sectional view along an axial direction illustrating a configuration of a fifth embodiment of the ball screw device according to the present invention.

Next, a fifth embodiment of the ball screw device according to the present invention will be described. Moreover, in descriptions of the present embodiment, since only the installation aspect of the seal member is different from the above-described fourth embodiment, the same reference numerals as the fourth embodiment are assigned to the same configurations, and the descriptions are omitted. FIG. 36 is a cross-sectional view along an axial direction illustrating the configuration of the fifth embodiment of the ball screw device according to the present invention. As illustrated in FIG. 36, in the present embodiment, the seal member 440 is a so-called clearance seal in which the seal member 440 does not come in contact with the outer circumferential surface of the screw shaft 410. In this way, when the clearance seal is adopted as the seal member 440, since the seal member 440 is able to move in the radial direction by the clearance, it is difficult to insert and fit the convex portion 443 into the concave portion 422.

Accordingly, in the present embodiment, as illustrated in FIG. 36, a gap $C_3$ between the convex portion 443 and the concave portion 422 in the radial direction is set to be larger than a gap $C_1$ between the outer circumferential surface 440a of the seal member 440 and the inner circumferential surface 420a of the nut 420, or a gap $C_2$ between the tip portion 442 of the lip portion of the seal member 440 and the outer circumferential surface 410a of the screw shaft 410. That is, the clearance (gap $C_3$) between the convex portion 443 and the concave portion 422 in the radial direction may be larger than the clearance (gap $C_2$) between the seal member 440 and the screw shaft 410 in the radial direction.

In addition, when the clearance (gap $C_1$) between the seal member 440 and the inner circumferential surface 420a of the nut 420 is smaller than the clearance (gap $C_2$) between the screw shaft 410 and the seal member 440, and the clearance (gap $C_3$) between the convex portion 443 and the concave portion 422 in the radial direction may be larger than the clearance (gap $C_1$) between the seal member 440 and the inner circumferential surface 420a of the nut 420.

Moreover, if the clearance with respect to the screw shaft 410 is provided even when the seal member 440 is formed of a hard material, the convex portion 443 is set to the height equal to or less than the clearance, an event in which the convex portion 443 strikes the concave portion and does not enter the nut 420 is not generated.

Embodiments of the present invention are described. However, the present invention is not limited thereto, and various modifications and improvement are able to be performed.

REFERENCE SIGNS LIST

1: ball screw device
4: screw shaft
7: nut
10: ball
13 and 16: rolling groove
22: seal member
25: core metal
28: main body portion
31: lip portion
34: convex portion
37: seal piece
40: sliding-contact portion
43: groove sliding-contact portion
46: land sliding-contact portion
55: protrusion
58: side surface portion
61: bottom portion
73: large diameter portion
76: small diameter portion
101: nut
111: rolling groove of nut
113: inner circumferential surface of nut
117: screw
102: screw shaft
121: rolling groove of screw shaft
121a: grinding clearance groove
122: outer circumferential surface of screw shaft
103: ball
104: seal member
141: core metal
141a: edge portion
142: lip portion
142a: tip portion of lip portion
105: return tube
106: outward flange
161: threaded hole
162: inner circumferential surface of outward flange
204: seal member
221: rolling groove of screw shaft
221a: grinding clearance groove
221b: boundary
241: core metal
242a: tip portion of lip portion
301: screw shaft
301a: rolling groove (screw shaft)
305: seal portion
312: inclined portion
313: bending portion
313a: tip portion
314: length of bending portion
315: bending point
316: annular portion
317: lip portion
401: ball screw device
410: screw shaft
410a: outer circumferential surface
411: rolling groove
420: nut
420a: inner circumferential surface
421: rolling groove
422: concave portion
430: ball
440: seal member
440a: outer circumferential surface
441: main body portion
442: tip portion (tip portion of lip portion)
443: convex portion

The invention claimed is:

1. A ball screw device comprising:
a screw shaft linearly extending and including a helical rolling groove formed on an outer circumferential surface;
a cylindrical nut including a rolling groove opposing the helical rolling groove on an inner circumferential surface, and screwed to the screw shaft via a plurality of balls which disposed between the rolling groove and the helical rolling groove of the screw shaft;
balls disposed between track grooves formed of the rolling groove of the nut and the rolling groove of the screw shaft;
an annular sealing device provided on an inner diameter side of the nut and sealing a gap between the nut and the screw shaft; and
a tip portion of a lip portion externally fitted to the screw shaft and including an inner circumferential edge portion coming into sliding-contact with an outer circumferential surface of the screw shaft,
wherein the tip portion of the lip portion includes an easily deformable portion elastically deformed so that a shape of the inner circumferential edge portion is matched to a shape of the outer circumferential surface of the screw shaft when the tip portion of the lip portion is assembled to the screw shaft, and
the helical rolling groove of the screw shaft includes a grinding clearance groove, and a depth of the grinding clearance groove is set to be smaller than interference of the tip portion of the lip portion with respect to the screw shaft.

2. The ball screw device according to claim 1,
wherein an angle at which the grinding clearance groove and the rolling groove come into contact with each other is equal to or more than 155°.

3. The ball screw device according to claim 1,
wherein the interference of a section in which the sealing device comes into contact with the vicinity of the grinding clearance groove is larger than the interference of a section in which the sealing device comes into contact with sections other than the grinding clearance groove.

4. The ball screw device according to claim 1,
wherein the shape of the grinding clearance groove is a gothic arc shape.

5. The ball screw device according to claim 1,
wherein the rolling groove of the screw shaft and the grinding clearance groove have a smooth cross-sectional shape formed with a curved surface portion.

6. The ball screw device according to claim 2,
wherein the interference of a section in which the sealing device comes into contact with the vicinity of the grinding clearance groove is larger than the interference of a section in which the sealing device comes into contact with sections other than the grinding clearance groove.

* * * * *